US012007468B2

United States Patent
Campbell et al.

(10) Patent No.: US 12,007,468 B2
(45) Date of Patent: Jun. 11, 2024

(54) RANGE-DOPPLER KEYSTONE PROCESSING FOR DIRECT SAMPLED RADAR DATA FROM TARGETS WITH LONG RANGE AND HIGH VELOCITY USING WAVEFORMS WITH HIGH BANDWIDTH, HIGH DUTY FACTOR, AND LONG DWELL

(71) Applicant: Raytheon Company, Tewksbury, MA (US)

(72) Inventors: James D. Campbell, Hermosa Beach, CA (US); Charles T. Hansen, Palos Verdes Estates, CA (US)

(73) Assignee: Raytheon Company, Tewksbury, MA (US)

( * ) Notice: Subject to any disclaimer, the term of this patent is extended or adjusted under 35 U.S.C. 154(b) by 242 days.

(21) Appl. No.: 17/643,639

(22) Filed: Dec. 10, 2021

(65) Prior Publication Data

US 2024/0012127 A1    Jan. 11, 2024

(51) Int. Cl.
*G01S 13/53*    (2006.01)
*G01S 7/288*    (2006.01)
*G01S 13/00*    (2006.01)

(52) U.S. Cl.
CPC ............ *G01S 13/53* (2013.01); *G01S 7/2883* (2021.05); *G01S 13/003* (2013.01)

(58) Field of Classification Search
CPC ....... G01S 13/53; G01S 7/2883; G01S 13/003
(Continued)

(56) References Cited

U.S. PATENT DOCUMENTS 7,450,057 B2   11/2008  Clark
7,629,920 B1 *  12/2009  Kuhl ...................... G01S 13/64
                                             342/160

(Continued)

FOREIGN PATENT DOCUMENTS

CN    102628937 A    8/2012
CN    106054157 A    10/2016
CN    110632573 A    12/2019

OTHER PUBLICATIONS

Adams et al., "Peak-Constrained Least-Squares Optimization;" IEEE Transactions on Signal Processing, vol. 46, No. 2; Feb. 1998; 16 Pages.
Akhtar et al., "Formation of Range-Doppler Maps Based on Sparse Reconstruction;" IEEE Sensors Journal, vol. 16. Issue 15; Published Jun. 7, 2016; pp. 5921-5926; 7 Pages.

(Continued)

*Primary Examiner* — Bo Fan
(74) *Attorney, Agent, or Firm* — Schwegman Lundberg & Woessner, P.A.

(57) ABSTRACT

A circuit comprises a receive processing window formation subsystem, a matched filter subsystem, a keystone interpolation subsystem, a phase modulation subsystem, and an image forming subsystem. The receive processing window formation subsystem forms, for each radar return from a scene, a receive processing window containing the radar return as an unbroken radar return. The matched filter subsystem creates a motion model for a reference point target disposed at a predetermined location within the scene, based on a set of motion compensation parameters for range and range rate, to compensate for at least some effects of fast time Doppler on the reference point target. The keystone interpolation subsystem rescales slow time information from the matched filter subsystem. A phase modulation subsystem applies phase modulations to a keystone-interpolated 2-D (Continued)

output array of information associated with the scene, to ensure proper registration in a range-Doppler map output of the scene.

20 Claims, 19 Drawing Sheets

(58) Field of Classification Search
USPC .......................... 342/160, 107, 59, 179, 196
See application file for complete search history.

(56) References Cited

U.S. PATENT DOCUMENTS

| | | | |
|---|---|---|---|
| 8,044,846 | B1 | 10/2011 | Urkowitz et al. |
| 9,103,918 | B2* | 8/2015 | Abatzoglou ........ G01S 13/9004 |
| 10,690,767 | B2 | 6/2020 | Hansen |
| 2020/0158861 | A1* | 5/2020 | Cattle ..................... G01S 13/89 |

OTHER PUBLICATIONS

Dogaru, "Doppler Processing with Ultra-Wideband (UWB) Radar Revisited;" ARL-TN-0866; US Army Research Laboratory (ARL); Jan. 2018; 28 Pages.

Jin et al., "Coherent Integration for Radar High-Speed Maneuvering Target Based on Frequency-Domain Second-Order Phase Difference;" Article in Journal of Electronics, vol. 8; Published Mar. 4, 2019; 19 Pages.

Kirkland, "Linear and Second Order Keystone Transforms and Their Applications;" Technical Memorandum; Defence Research and Development Canada—Ottawa; Oct. 2013; 66 Pages.

Perry et al., "Coherent Integration With Range Migration Using Keystone Formatting;" Technical Paper from the MITRE Corporation; Mar. 2007; 6 Pages.

Richards, "The Keystone Transformation for Correcting Range Migration in Range-Doppler Processing;" Retrieved from https://radarsp.weebly.com; Mar. 28, 2014; Revised Nov. 20, 2019; 29 Pages.

* cited by examiner

2270

RANGE-DOPPLER KEYSTONE PROCESSING FOR DIRECT SAMPLED RADAR DATA FROM TARGETS WITH LONG RANGE AND HIGH VELOCITY USING WAVEFORMS WITH HIGH BANDWIDTH, HIGH DUTY FACTOR, AND LONG DWELL

STATEMENT REGARDING FEDERALLY SPONSORED RESEARCH

The Government may have certain rights in the invention pursuant to contract number FA8240-19-C-4902.

FIELD

Embodiments of the disclosure generally relate to devices, systems, and methods for radar signal processing. More particularly, the disclosure describes embodiments relating to devices, systems, and methods for range-Doppler processing using the keystone transform.

BACKGROUND

Radar systems are systems that use uses radio waves to illuminate a given scene (object space illuminated by the radar) to determine the distance (range), angle, or velocity of objects, and/or to determine other characteristics of objects, and typically include a transmitter producing electromagnetic waves in the radio or microwaves domain, a transmitting antenna, a receiving antenna (often the same antenna is used for transmitting and receiving, but in some examples, a transmitting antenna and a receiving antenna can be different and/or separated, and in some instances the transmitting antenna can be at a first location and the receiving antenna can be at a second location separate from, and possibly distant from, the first location) and a receiver and processor to determine properties of the object(s). Radar systems also can include more than one transmitter and/or more than one receiver, which can be co-located or separated (as is understood in the art with monostatic, bistatic, and/or multistatic radars, for example). Radio waves (pulsed or continuous) from the transmitter reflect off the object and return to the receiver, giving information about the object's location and speed, which can be derived, in some instances, based on the strength and time delay of the returned signal. In many systems, the antenna is an antenna array, which is a group of multiple connected antennas coupled to a common source or load to act as a single antenna and produce a directive radiation pattern. Radar systems can be used in many applications, including as part of planetary surveillance and missile defense systems. For example, planetary radar systems are a means for tracking and studying asteroids and comets, for mapping planetary and other space surfaces, for monitoring planets and their orbits, and even for tracking of geostationary and lower orbit satellites, near earth objects (NEOs), near earth asteroids (NEAs), and/or various ephemeris-related objects (i.e., naturally occurring objects and/or artificial satellites in the sky), which can be defined in an ephemerides book or set of tables giving the trajectory of astronomical objects as well as artificial satellites in the sky, i.e., the position (and possibly velocity) over time.

SUMMARY

The following presents a simplified summary in order to provide a basic understanding of one or more aspects of the embodiments described herein. This summary is not an extensive overview of all of the possible embodiments and is neither intended to identify key or critical elements of the embodiments, nor to delineate the scope thereof. Rather, the primary purpose of the summary is to present some concepts of the embodiments described herein in a simplified form as a prelude to the more detailed description that is presented later.

In one aspect, a system is provided, comprising a memory and a processor. The memory stores instructions for processing radar data contained within a plurality of radar returns received at a radar receiver, the plurality of radar returns associated with a scene being illuminated by a plurality of pulses transmitted by a radar transmitter. The processor is in operable communication with the memory and is configured to execute instructions stored on the memory to process the radar data. The processor executes the instructions to implement a receive processing window formation subsystem, a matched filter subsystem, a keystone interpolation subsystem, a phase modulation subsystem, and an image forming subsystem.

The receive processing window formation subsystem is configured to receive the plurality of radar returns from the scene, form, for each radar return in the plurality of radar returns, a respective receive processing window containing the radar return as an unbroken radar return, and generate, for each respective unbroken radar return, a two-dimensional (2-D) array of data associated with the respective unbroken radar return, wherein one dimension of the 2-D array comprises overlapped receive range data The matched filter subsystem is in operable communication with the receive processing window formation subsystem and is configured to create a motion model for a reference point target disposed at a predetermined location within the scene based on an output of the receive processing window formation subsystem and on a set of motion compensation parameters for range and range rate, wherein the matched filter subsystem is configured to compensate for at least some effects of fast time Doppler on the reference point target, and wherein the matched filter subsystem is configured to output a two dimensional (2-D) array of information associated with the scene, the 2-D array comprising a first dimension comprising fast time frequency information and a second dimension comprising slow time information.

The keystone interpolation subsystem is configured to receive the 2-D array of information associated with the scene, from the matched filter subsystem, wherein the slow time information in the 2-D array of information is associated with a first scale, and wherein the keystone interpolation subsystem is configured to rescale the slow time information to a predetermined second scale, to produce a keystone interpolation subsystem output, comprising a keystone-interpolated 2-D output array of information associated with the scene, the information associated with the scene comprising a first-dimension of fast frequency and a second dimension of slow time.

The phase modulation subsystem is configured to receive the keystone interpolation subsystem output and to apply phase shifts to the keystone-interpolated 2-D output array of information associated with the scene, to shift each range rate bin in a range-Doppler map associated with the keystone-interpolated 2-D output array, in range, to ensure proper registration. The image forming subsystem is configured to generate, based on receiving a phase modulation output array, a range-Doppler map output of the scene having a predetermined range rate extent.

In a further embodiment, the processor is further configured to provide a range compression inverse Fourier transform subsystem that is configured to perform an inverse Fourier transform on the output of the matched filter subsystem to produce a range compression inverse Fourier transform subsystem output comprising a set of range-compressed motion-compensated pulse data that is operably communicated to the keystone interpolation subsystem.

In some embodiments, the processor is further configured to implement a range window subsystem that is configured to perform a range windowing process on the range compression inverse Fourier transform subsystem output to minimize a rate of data into the keystone interpolation subsystem, wherein the range window subsystem is configured to analyze the set of range-compressed motion-compensated pulse data of the range compression inverse Fourier transform subsystem output to determine a first subset of the range-compressed motion-compensated pulse data that is not in a range of interest, based on an overlapping arrangement of receive data into the receive processing window; define a second subset of the range-compressed motion-compensated pulse data comprising samples in a range of interest; and provide only the second subset of the range-compressed motion-compensated pulse data to the keystone interpolation subsystem.

In some embodiments, the plurality of radar returns comprises a one-dimensional data record, and the receive processing window formation subsystem is configured to: define an expanded processing window having a size greater than a sum of a pulse repetition interval (PRI) and a pulsewidth associated with the plurality of radar returns from at least a first scatterer in the scene; and slide the expanded processing window along the one-dimensional data record, one pulse at a time, wherein for each pulse, the data contained within the expanded processing window are copied into a two-dimensional array (2-D) whose dimensions are range sample number and pulse number, so that contents of the window are copied into a corresponding pulse of the 2-D array so that each pulse contains a respective unbroken return from a respective target in the scene.

In some embodiments, the matched filter subsystem is configured to operate on fast frequency data received as an output of a first range Fourier transform subsystem, wherein the first range Fourier transform subsystem is configured to perform a Fourier transform on the overlapped receive range data in an output of the receive processing window formation subsystem, before the output of the receive processing window formation subsystem is provided to the matched filter subsystem.

In some embodiments, the processor is further configured to implement a range window subsystem that is configured to perform a range windowing process on the range compression inverse Fourier transform subsystem output, to minimize a rate of data into the keystone interpolation subsystem, wherein the range window subsystem is configured to: analyze the set of range-compressed motion-compensated pulse data of the range compression inverse Fourier transform subsystem output to determine a first subset of the range-compressed motion-compensated pulse data that is not in a range of interest, based on an overlapping arrangement of receive data into the receive processing window; define a second subset of the range-compressed motion-compensated pulse data comprising samples in a range of interest; and provide only the second subset of the range-compressed motion-compensated pulse data to the keystone interpolation subsystem.

In a further embodiment, the plurality of radar returns comprises a one-dimensional data record and the receive processing window formation subsystem is configured to: define an expanded processing window having a size greater than a sum of a pulse repetition interval (PRI) and a pulsewidth associated with the plurality of radar returns from at least a first scatterer in the scene; and slide the expanded processing window along the one-dimensional data record, one pulse at a time, wherein for each pulse, the data contained within the expanded processing window are copied into a two-dimensional array (2-D) whose dimensions are range sample number and pulse number, so that contents of the window are copied into a corresponding pulse of the 2-D array so that each pulse contains a respective unbroken return from a respective target in the scene.

In some embodiments, the matched filter subsystem is configured to operate on fast frequency data received as an output of a first range Fourier transform subsystem, wherein the first range Fourier transform subsystem is configured to perform a Fourier transform on the overlapped receive range data in an output of the receive processing window formation subsystem, before the output of the receive processing window formation subsystem is provided to the matched filter subsystem. In some embodiments, matched filter subsystem is configured to: define a set of matched filter parameters based on a linear model of target range, a linear frequency modulation (LFM) waveform, and on the set of motion compensation parameters; and apply a matched filter, based on the set of matched filter parameters, to a fast-time Fourier transform of the output of the receive processing window formation subsystem.

In further embodiments, the keystone interpolation subsystem is configured to apply a low-pass finite impulse response (FIR) filter to rescale the slow time information to the predetermined second scale, wherein a passband of the FIR filter is configured to correspond to a desired range rate extent in the range-Doppler map output.

In further embodiments, the phase modulation subsystem is configured to: perform a range rate inverse Fourier transform on the keystone-interpolated 2-D output array, to convert the keystone-interpolated 2-D output array to a 2-D phase modulation input array, the 2-D phase modulation input array comprising information associated with the scene, comprising a first dimension of fast frequency and a second dimension of range rate relative to the set of motion compensation parameters; determine a phase modulation for each range rate bin of a range-Doppler map for a target located within the scene, to ensure proper registration; apply the phase modulations to the 2-D phase modulation input array; and generate a phase modulation output array comprising the phase-modulated 2-D phase modulation input array.

In some embodiments, the radar receiver and radar transmitter are part of at least one of a bistatic and a multistatic radar system. In some embodiments, the predetermined location corresponds to a location that is at an approximate center of the scene. In some embodiments, the plurality of radar returns corresponds to radar returns from a train of transmitted pulses from the radar transmitter and wherein each respective receive processing window that is formed is associated with a respective one of the pulses in the train of transmitted pulses.

In another aspect, a method is provided. A plurality of radar returns is received, the plurality of radar returns associated with a scene being illuminated by a plurality of pulses. For each radar return in the plurality of radar returns, a respective receive processing window is formed, containing the radar return as an unbroken radar return. For each respective unbroken radar return, a two-dimensional (2-D) array of data is generated, the 2-D array of data associated with the respective unbroken radar return, wherein one dimension of the 2-D array comprises overlapped receive range data. A matched filter is provided, where the matched filter is configured to create a motion model for a reference point target disposed at a predetermined location within the scene based on the 2-D array of data and on a set of motion compensation parameters for range and range rate; compensate for at least some effects of fast time Doppler on the reference point target; and output a two dimensional (2-D) array of information associated with the scene, the 2-D array comprising a first dimension comprising fast time frequency information and a second dimension comprising slow time information.

A keystone interpolation is performed on the 2-D array of information associated with the scene, the keystone interpolation comprising associating the slow time information in the 2-D array with a first scale; and rescaling the slow time information to a predetermined second scale, to produce a keystone-interpolated 2-D output array of information associated with the scene, the information associated with the scene comprising a first-dimension of fast frequency and a second dimension of slow time Phase modulations are applied to the keystone-interpolated 2-D output array of information associated with the scene, to shift each range rate bin in a range-Doppler map associated with the keystone-interpolated 2-D output array, in range, to ensure proper registration. A range-Doppler map is generated based on receiving a phase modulation output array, wherein the range-Doppler map output of the scene has a predetermined range rate extent.

In further embodiments of this aspect, an inverse Fourier transform is performed on the 2-D array of information associated with the scene, before performing keystone interpolation, wherein the inverse Fourier transform produces a set of range-compressed motion-compensated pulse data.

In some embodiments, a range windowing process is performed on the set of range-compressed motion-compensated pulse data before performing keystone interpolation, the range windowing process comprising: analyzing the range-compressed motion-compensated pulse data to determine a first subset of the range-compressed motion-compensated pulse data that is not in a range of interest, based on an overlapping arrangement of receive data into the receive processing window; defining a second subset of the range-compressed motion-compensated pulse data comprising samples in a range of interest; and providing only the second subset of the range-compressed motion-compensated pulse data as an input to performing a keystone interpolation on the 2-D array of information associated with the scene, wherein the range windowing process is configured to minimize a rate of data into the performing of the keystone interpolation.

In further embodiments, the plurality of radar returns comprises a one-dimensional data record and an expanded processing window is defined, the expanded processing window having a size greater than a sum of a pulse repetition interval (PRI) and a pulsewidth associated with the plurality of radar returns from at least a first scatterer in the scene. The expanded processing window is slid along the one-dimensional data record, one pulse at a time, wherein for each pulse, the data contained within the expanded processing window are copied into a two-dimensional array (2-D) whose dimensions are range sample number and pulse number, so that contents of the window are copied into a corresponding pulse of the 2-D array so that each pulse contains a respective unbroken return from a respective target in the scene.

In a further embodiment, a set of matched filter parameters is defined, the set of matched filter parameters based on a linear model of target range, a linear frequency modulation (LFM) waveform, and on the set of motion compensation parameters. A matched filter is applied, based on the set of matched filter parameters, to a fast-time Fourier transform of an output of the receive processing window.

In a further embodiment, keystone interpolation further comprises applying a low-pass finite impulse response (FIR) filter to rescale the slow time information to the predetermined second scale, wherein a passband of the FIR filter is configured to correspond to a desired range rate extent in the range-Doppler map output.

In certain embodiments, a range rate inverse Fourier transform is performed on the keystone-interpolated 2-D output array, to convert the keystone-interpolated 2-D output array to a 2-D phase modulation input array, the 2-D phase modulation input array comprising information associated with the scene, comprising a first dimension of fast frequency and a second dimension of range rate relative to the set of motion compensation parameters. A phase modulation is determined for each rate bin of a range-Doppler map for a target located within the scene, to ensure proper registration. The phase modulations are applied to the 2-D phase modulation input array. A phase modulation output array is generated, the phase modulation output array comprising the phase shifted 2-D phase modulation input array.

In a further aspect, a circuit is provided, comprising a receive processing window formation subsystem, a matched filter subsystem, a keystone interpolation subsystem, a phase modulation subsystem, and an image forming subsystem.

The receive processing window formation subsystem is configured to receive a plurality of radar returns from a scene, the plurality of radar returns associated with a scene being illuminated by a plurality of pulses transmitted by a radar transmitter, to form, for each radar return in the plurality of radar returns, a respective receive processing window containing the radar return as an unbroken radar return, and to generate, for each respective unbroken radar return, a two-dimensional (2-D) array of data associated with the respective unbroken radar return, wherein one dimension of the 2-D array comprises overlapped receive range data.

The matched filter subsystem is in operable communication with the receive processing window formation subsystem and is configured to create a motion model for a reference point target disposed at a predetermined location within the scene based on an output of the receive processing window formation subsystem and on a set of motion compensation parameters for range and range rate, wherein the matched filter subsystem is configured to compensate for at least some effects of fast time Doppler on the reference point target, and wherein the matched filter subsystem is configured to output a two dimensional (2-D) array of information associated with the scene, the 2-D array of information comprising a first dimension comprising fast time frequency information and a second dimension comprising slow time information.

The keystone interpolation subsystem is configured to receive the 2-D array of information associated with the scene, from the matched filter subsystem, wherein the slow time information in the 2-D array of information is associated with a first scale, and wherein the keystone interpolation subsystem is configured to rescale the slow time information to a predetermined second scale, to produce a keystone interpolation subsystem output, comprising a keystone-interpolated 2-D output array of information associated with the scene, the information associated with the scene comprising a first-dimension of fast frequency and a second dimension of slow time.

A phase modulation subsystem is configured to receive the keystone interpolation subsystem output and to apply phase modulations to the keystone-interpolated 2-D output array of information associated with the scene, to shift each range rate bin in a range-Doppler map associated with the keystone-interpolated 2-D output array, in range, to ensure proper registration. The image forming subsystem is configured to generate, based on receiving a phase modulation output array, a range-Doppler map output of the scene having a predetermined range rate extent.

In some embodiments, the plurality of radar returns comprises a one-dimensional data record, and the receive processing window formation subsystem is configured to: (1) define an expanded processing window having a size greater than a sum of a pulse repetition interval (PRI) and a pulsewidth associated with the plurality of radar returns from at least a first scatterer in the scene; (2) slide the expanded processing window along the one-dimensional data record, one pulse at a time, wherein for each pulse, the data contained within the expanded processing window are copied into a two-dimensional array (2-D) whose dimensions are range sample number and pulse number, so that contents of the window are copied into a corresponding pulse of the 2-D array so that each pulse contains a respective unbroken return from a respective target in the scene.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims included herein.

Details relating to these and other embodiments are described more fully herein.

BRIEF DESCRIPTION OF THE DRAWINGS

The advantages and aspects of the described embodiments, as well as the embodiments themselves, will be more fully understood in conjunction with the following detailed description and accompanying drawings, in which.

The drawings are not to scale, emphasis instead being on illustrating the principles and features of the disclosed embodiments. In addition, in the drawings, like reference numbers indicate like elements.

DETAILED DESCRIPTION

Figure 1:
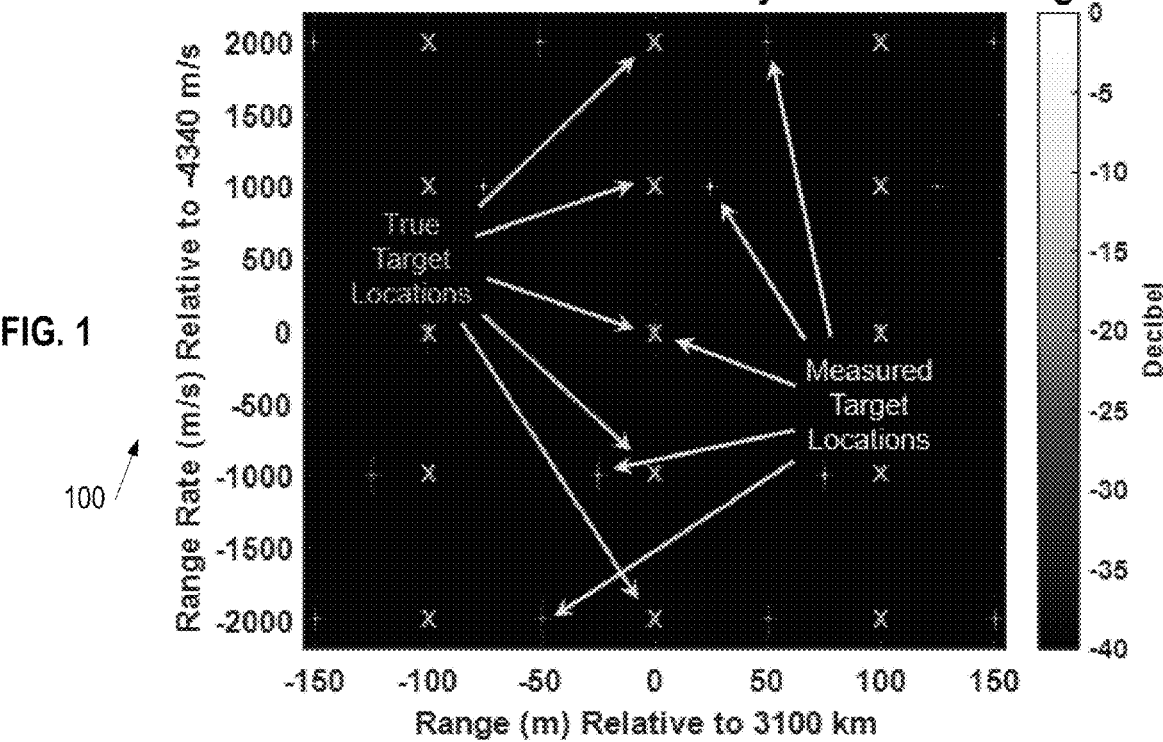
FIG. 1 is a first map illustrating a range-Doppler map of a ballistic missile scenario with conventional keystone processing.

The following detailed description is provided, in at least some examples, using the specific context of target detection systems (e.g., radar systems) configured to detect, track, monitor, image, and/or identify targets, where targets can include (but are not limited to) aircraft (both unmanned and manned), unmanned aerial vehicles, unmanned autonomous vehicles, robots, ships, spacecraft, automotive vehicles, ballistic missiles, rockets, and both artificial and naturally-occurring astronomical bodies (including ephemerides types of objects and bodies). The scene where the targets are being detected, tracked, monitored, imaged, and/or identified, at least refers to an area under investigation by one or more sensors (e.g., transmitters and receivers, which in some embodiments are part of the same radar system, and in some embodiments can be part of a different radar system) of one or more radar systems, such as defined volume of space and/or a defined region or volume of an object (e.g., a moon) that is being illuminated by a radar transmitter, towards which radar signals (e.g., pulses) are directed and from which radar returns are received at a radar receiver. A radar system that is usable with at least some embodiments herein can take many forms, e.g., monostatic, bistatic, multistatic, etc., as is understood in the art. At least some embodiments herein may be advantageous for certain types of bistatic and/or multistatic radar configurations used in connection with celestial or space imaging, where the transmitter (or multiple transmitters) are in a first location and the receiver (or multiple receivers) are in a second location that is geographically distant from the first location, where the receivers(s) may be configured to receive echoes/returns that the transmitter(s) sent hours before. Scenes can be stationary or can themselves be undergoing motion. A scene can include a volume of space through which one or more targets may pass or be disposed. A scene of a given object can include all of an object or just a portion of an object.

At least some embodiments herein are usable with any systems involved with any radar applications, including but not limited to military radars, air traffic control radars, weather monitoring radars, etc. At least some embodiments herein are usable with any systems involved in the creation of a radar image, where the radar image refers at least to an image that is generated based on recording radar waves reflected from a given target surface, where the radar image typically includes information associated with a measured distribution of echo power in delay, Doppler, and/or up to two angular coordinates.

At least some embodiments herein are usable with any systems involved in the creation of a radar map, which at least refers to a display or image, in suitable target-centered coordinates, of the residuals with respect to a graph or diagram that parameterizes a target's size, shape, rotation, average scattering properties, and possibly its motion with respect to delay-Doppler characteristics. For example, in accordance with certain embodiments herein, an improved range-Doppler map can be produced by configuring a radar system to transmit a plurality of pulses towards a desired scene to be illuminated, receiving radar returns, based on those pulses, into an array of overlapped receive processing windows, performing a range Fourier transform on the receive processing window array, performing a matched filtering operation (along with other operations described herein), applying a keystone transformation, performing a range rate inverse Fourier transform, and then applying phase modulation for range registration, and then performing a range inverse Fourier transform, to form a range-Doppler map of the scene. As is understood, a range-Doppler map can be used for target detection and tracking as it provides estimates of both range and velocity.

Unless specifically stated otherwise, those of skill in the art will appreciate that, throughout the present detailed description, discussions utilizing terms such as "opening", "configuring," "receiving,", "detecting," "retrieving," "converting", "providing,", "storing," "checking," "uploading", "sending,", "determining", "reading", "loading", "overriding", "writing", "creating", "including", "generating", "associating", and "arranging", and the like, refer to the actions and processes of a computer system or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The disclosed embodiments are also well suited to the use of other computer systems such as, for example, optical and mechanical computers. Additionally, it should be understood that in the embodiments disclosed herein, one or more of the steps can be performed manually.

Before describing in detail the particular improved systems, devices, and methods, it should be observed that the concepts disclosed herein include but are not limited to a novel structural combination of software, components, and/or circuits, and not necessarily to the particular detailed configurations thereof. Accordingly, the structure, methods, functions, control and arrangement of components and circuits have, for the most part, been illustrated in the drawings by readily understandable and simplified block representations and schematic diagrams, in order not to obscure the disclosure with structural details which will be readily apparent to those skilled in the art having the benefit of the description herein.

Direct sampled radar data can involve tracking targets at long range and high velocity, using waveforms having high bandwidth, high duty factor, and long dwell time. However, the processing methods used to generate a high-resolution image from a plurality of radar returns may have various shortcomings. For example, various problems can arise with conventional range-Doppler keystone processing of direct sampled radar data from targets at long range and high velocity when using waveforms of high bandwidth, high duty factor, and long dwell. These include distortion of the range-Doppler map, pulse compression artifacts, and high processor load. In some instances, the processed radar returns can have range errors, wherein target locations are not where they are expected to be.

Figure 2:
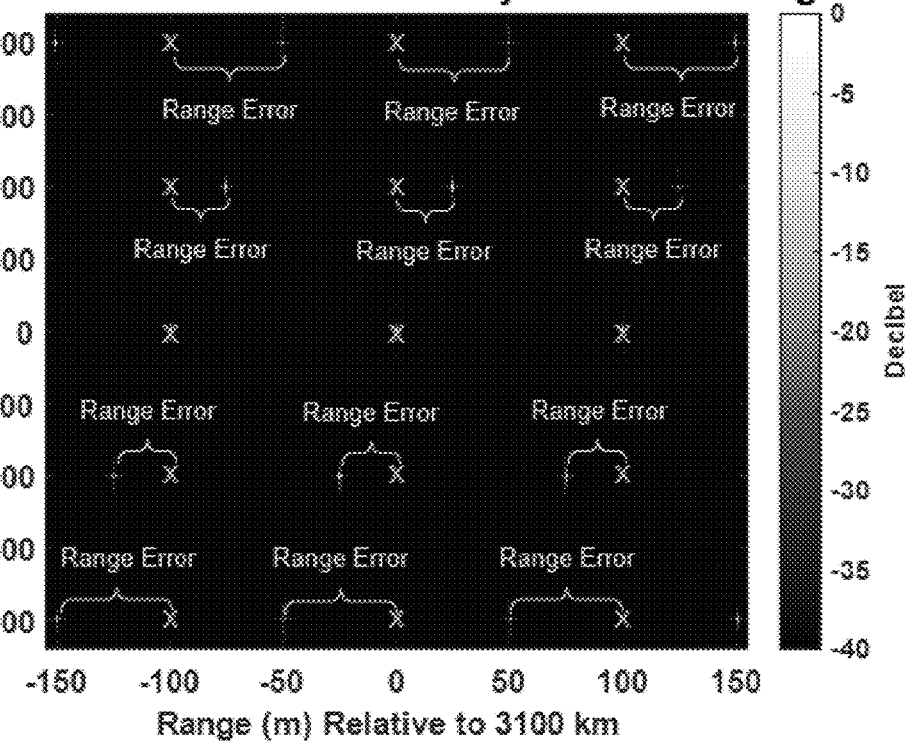
FIG. 2 is a second map illustrating a range-Doppler map of a ballistic missile scenario with conventional keystone processing.

For example, FIGS. 1 and 2 are a first range-Doppler map 100 and a second range-Doppler map 200, respectively, based on simulated data, each illustrating a range-Doppler map of a ballistic missile scenario with conventional keystone processing. As is known in the art, range-Doppler maps are two-dimensional (2-D) reflectivity maps of the scene under investigation by the radar sensor, plotted as a function of the range and radial velocity/range rate (or, equivalently, Doppler frequency) dimensions. The creation of the range-Doppler map can be seen as the application of a matched filter along these two dimensions.

As FIGS. 1 and 2 show, with conventional keystone processing, the range-Doppler map is distorted, where the measured simulated target locations differ from the true simulated target locations. The map 200 of FIG. 2 highlights the range errors shown in the map 200 of FIG. 1. Range error after conventional keystone processing (as shown in FIGS. 1 and 2) is proportional to the range rate of the target relative to range rate of motion compensation point.

At least some embodiments herein attempt to resolve at least some of these concerns and can help to put targets at the correct location in the range-Doppler map. In certain embodiments, a processor, system, and method are provided that can provide:

(1) a correction for range errors that are proportional to a) the range rate relative to that of the motion compensation point, b) the target range at transmit time, and c) the dwell time;
(2) a computationally efficient matched filter without artifacts from high duty factor waveform;
(3) a range windowing operation to reduce the number of keystone interpolation operations; and
(4) a computationally efficient keystone interpolator.

Figure 3:
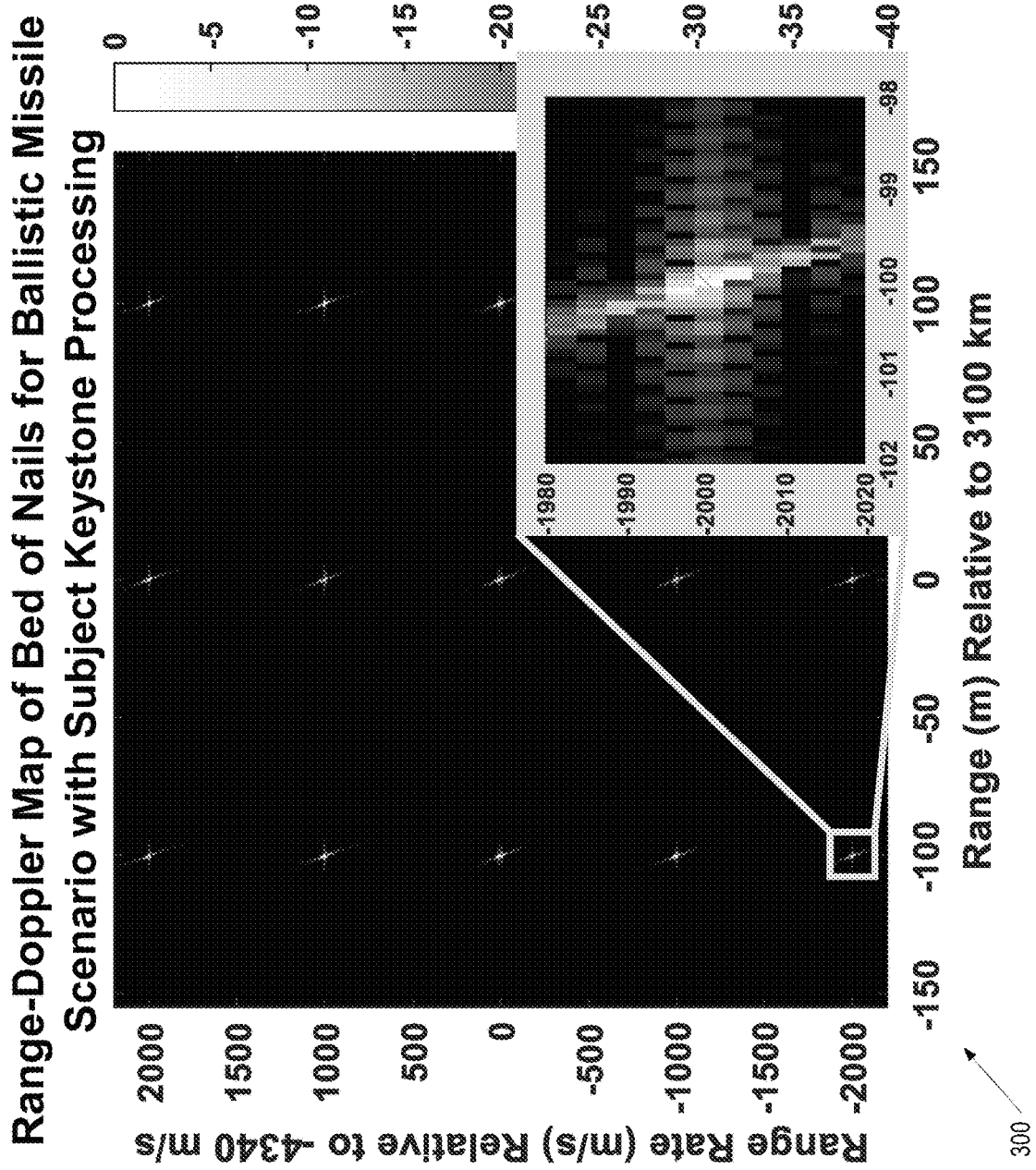
FIG. 3 is a third map illustrating a range-Doppler map of a ballistic missile scenario with keystone processing as provided in accordance with at least some embodiments herein.

For example, FIG. 3 is a third map 300 illustrating a range-Doppler map of a ballistic missile scenario with keystone processing as provided as part of a method in accordance with at least some embodiments herein. The map of FIG. 3 illustrates a map of targets that have undergone the correction for range errors listed at (1) above, in accordance with at least some embodiments herein. These and other features (including those listed above at (1) through (4)) are described further herein.

In particular, in certain embodiments herein, a processor is provided that helps to address at least some of the aforementioned issues. In certain embodiments, the processor employs a matched filter with a range rate parameter and an overlapping windowing technique that is configured to motion-compensate and range-compress the direct sampled data in an efficient manner without artifacts that otherwise occur due to high range rate and high duty factor. After matched filtering, an efficient keystone interpolator is applied. Additionally, phase modulations are applied to correct for range errors that are proportional to 1) the range rate relative to the motion compensation point, 2) target range at transmit time, and 3) dwell time. Finally, the data are transformed into a range-Doppler map. In still further embodiments, a range windowing operation is provided between the matched filter and the keystone interpolation to discard data that are not needed, and thereby to help improve computational efficiency by reducing the number of keystone interpolations that are needed.

Figure 4:
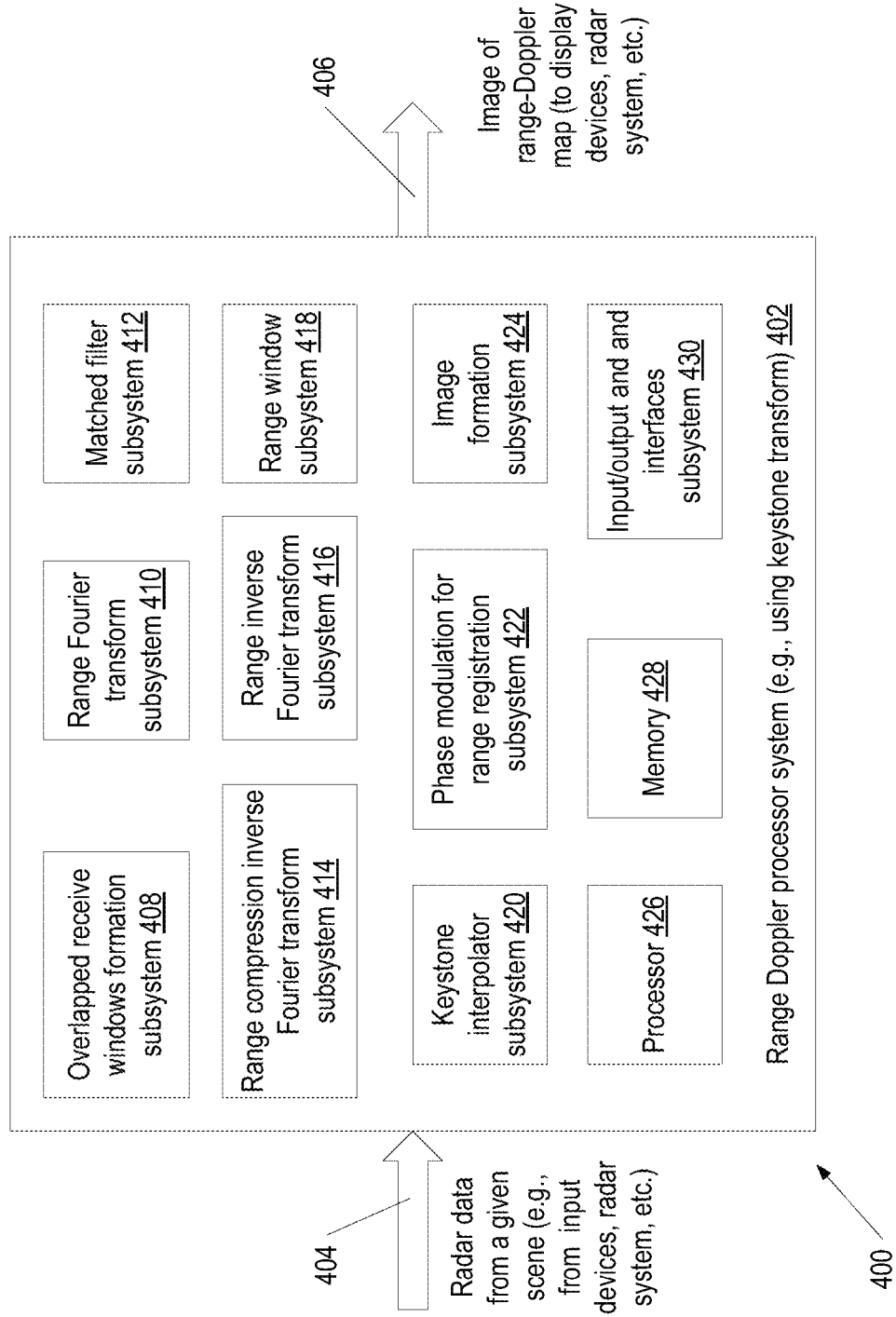
FIG. 4 is a functional block diagram of a range-Doppler processing system, in accordance with one embodiment.

FIG. 4 is a block diagram 400 of a range-Doppler processing system 402, in accordance with one embodiment, where the range-Doppler processing system is configured to use and apply a keystone transform. The range-Doppler processing system 402 includes multiple modules that are configured to cooperate to implement the range-Doppler processing described herein. The range-Doppler processing system 402 receives as inputs radar data 402, such as radar data from one or more input devices, a radar system, etc. The output 406 of the range-Doppler processing system 402 includes an image of a range-Doppler map, which can be provided to a display device, to another system such as another part of a radar system, etc.

The range-Doppler processing system 402, in one embodiment, includes a processor 426 and a memory 428, the memory storing instructions for the processor 426 to configure and implement various subsystems, as well as an input/output and interfaces subsystem 430, which is configured to receive the radar data 404 and output the range-Doppler map image 406. The subsystems of the range-Doppler processing system 402, in one embodiment, include an overlapped receive windows formation subsystem 408, a range Fourier transform subsystem 410, a matched filter subsystem 412, a range compression inverse Fourier transform subsystem 414, a range inverse Fourier transform subsystem 416, a range window subsystem 418, a keystone interpolator subsystem 420, a phase modulator for range registration subsystem, and an image formation subsystem 424. Each of these subsystems helps to implement the method of FIG. 5, which is a first high-level flow chart 500 detailing a method of operation of the range-Doppler processing system of FIG. 4, in accordance with one embodiment. The method 500 of FIG. 5, and the system 402 of FIG. 4, are discussed further below.

Figure 5:
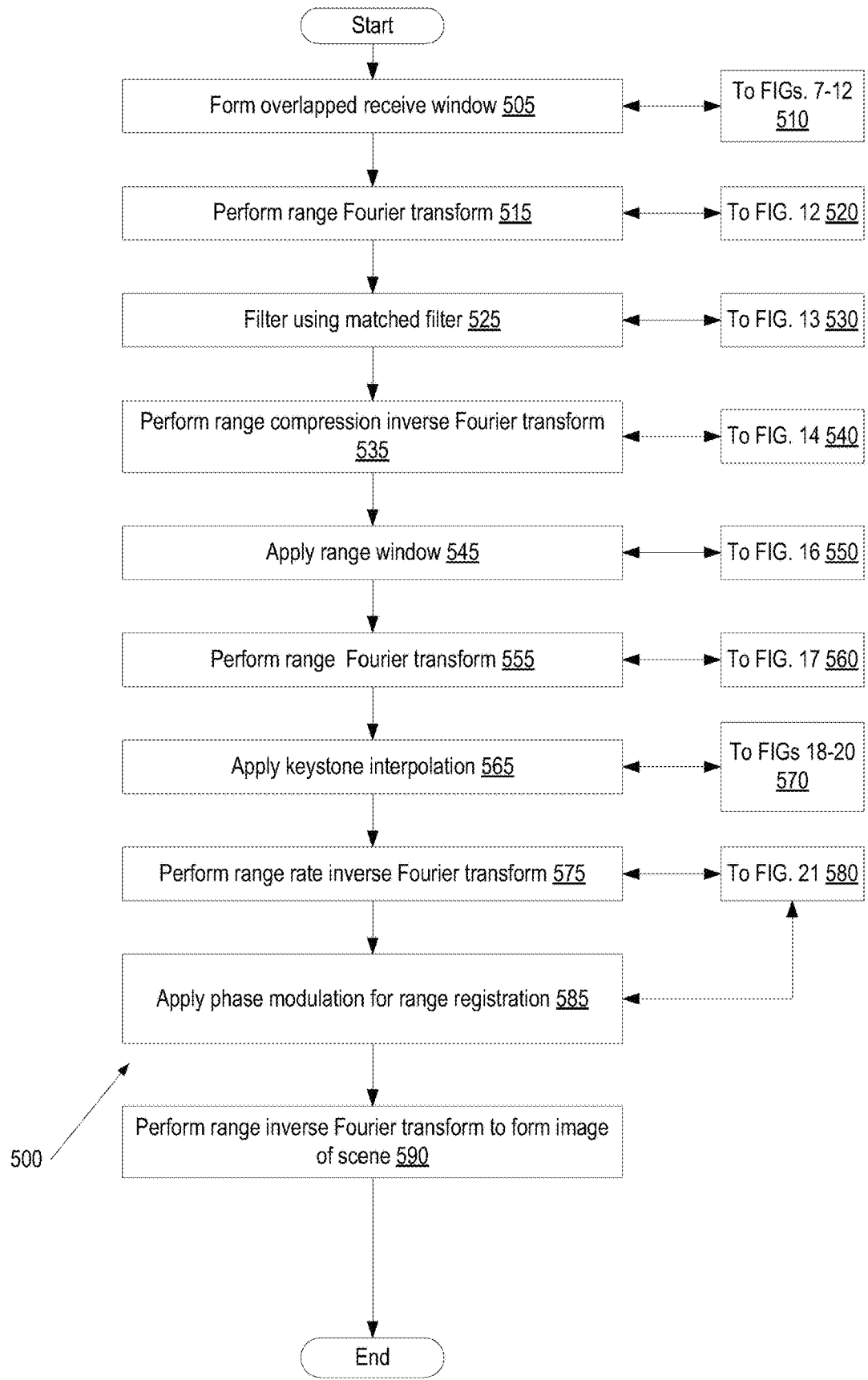
FIG. 5 is a first high-level flow chart detailing a method of operation of the range-Doppler processing system of FIG. 4, in accordance with one embodiment.
Figure 7:
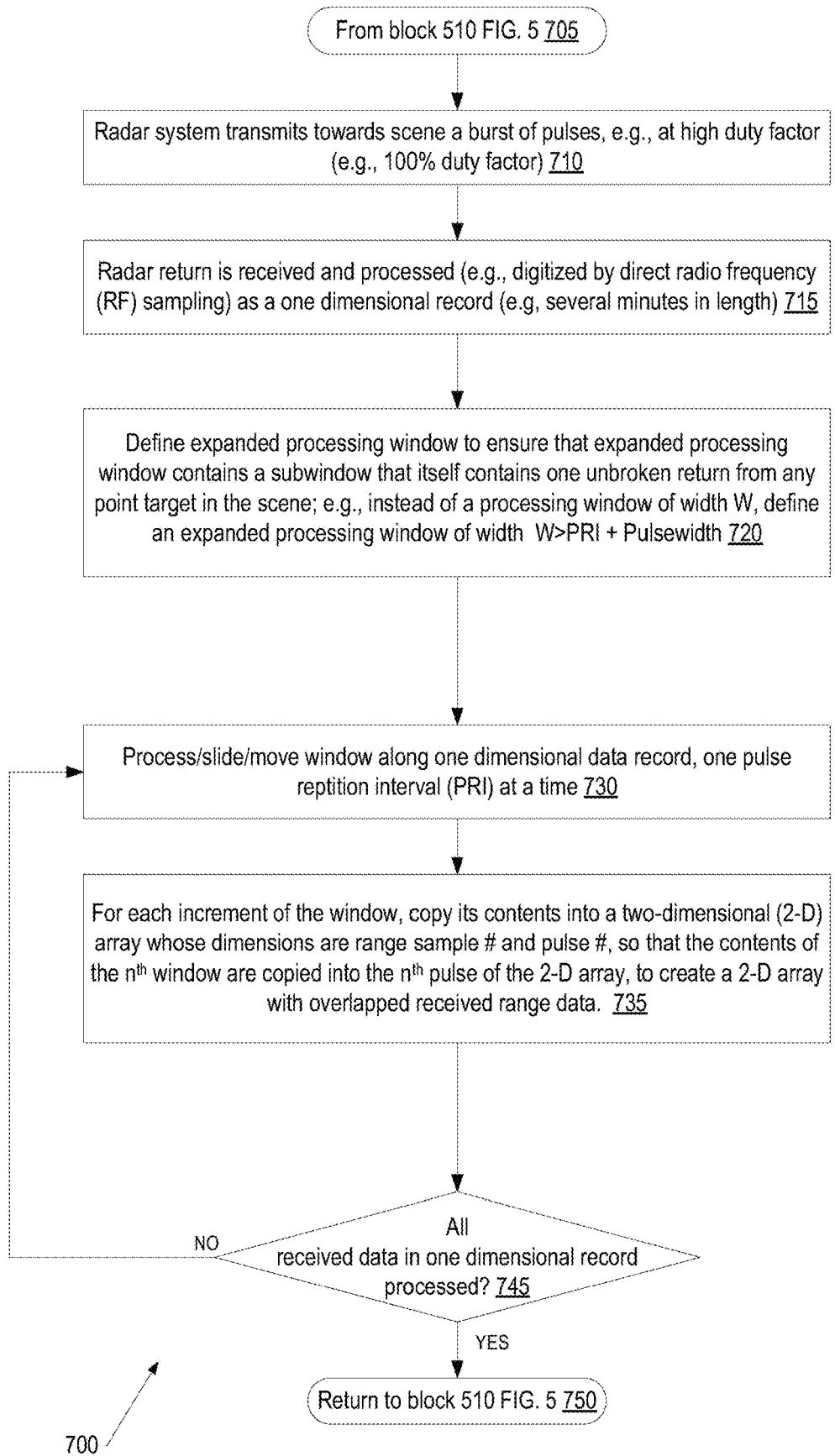
FIG. 7 is a flow chart detailing a method of forming an overlapped receive window, in accordance with one embodiment.

Referring to the method 500 of FIG. 5, the method starts with forming overlapped receive windows (block 505), a process which is further detailed in FIG. 7, which is a flow chart 700 detailing a method of forming the overlapped receive windows, in accordance with one embodiment (Note also that each receive window is treated independently of other receive windows). The method 700 of FIG. 7, in certain embodiments, provides a process configured to implement the overlapped receive windows formation subsystem 408 of FIG. 4.

Figure 8:
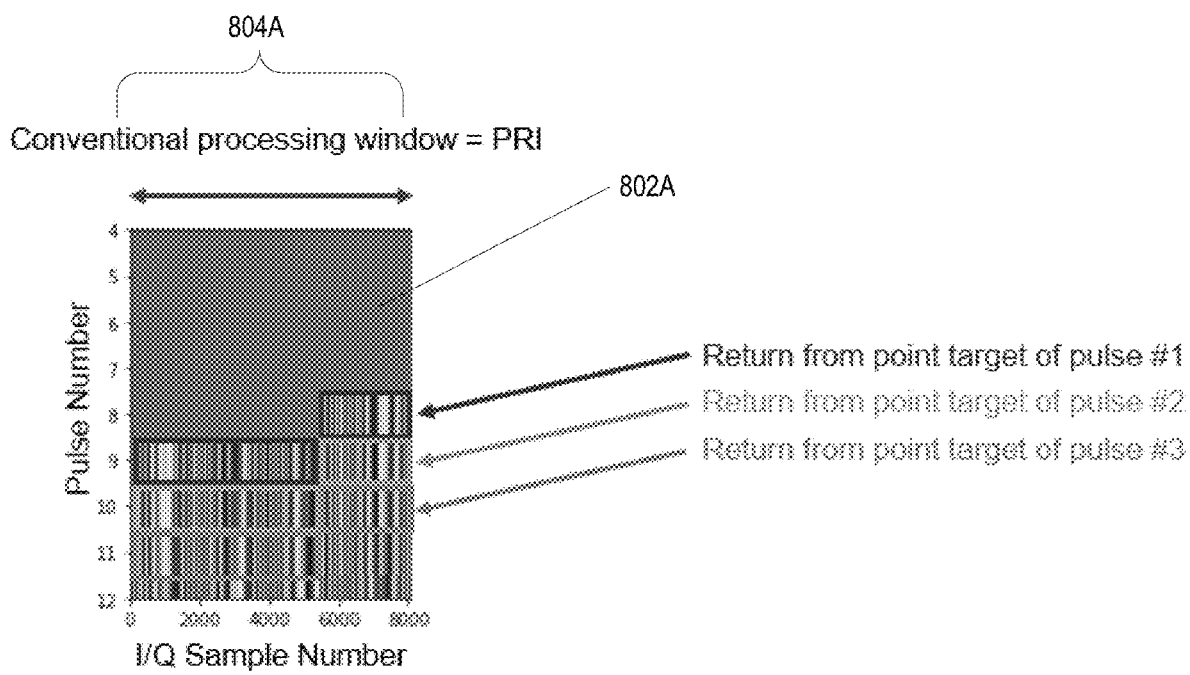
FIG. 8 is an exemplary graph of a conventional processing window, in accordance with one embodiment.
Figure 9:
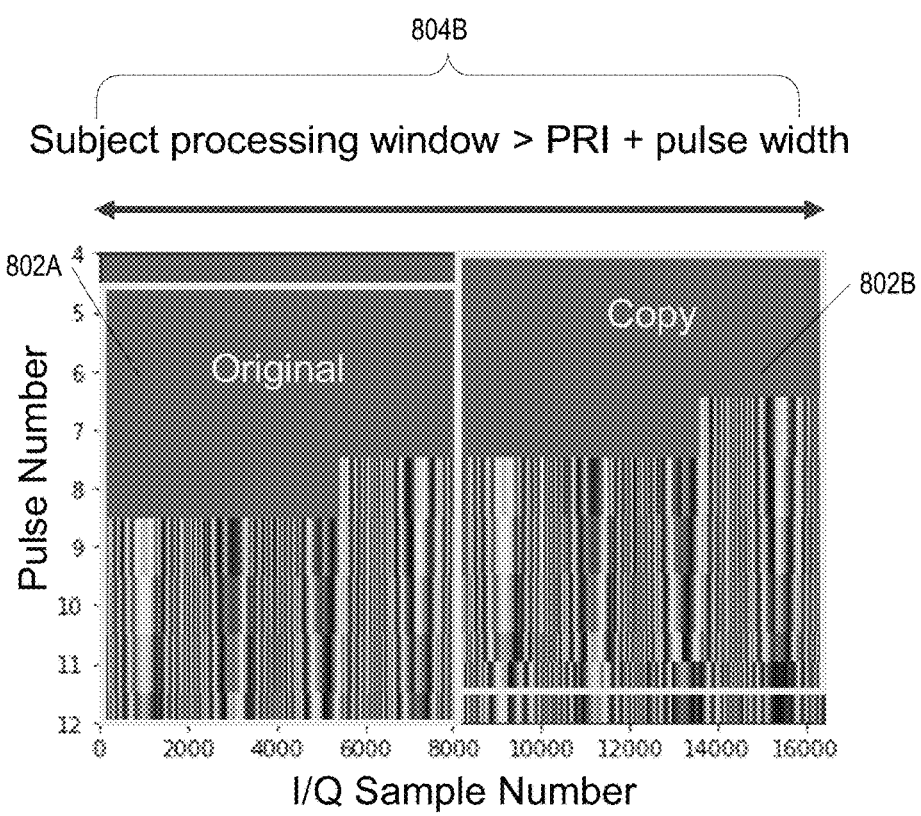
FIG. 9 is an exemplary graph of an expansion of the conventional processing window of FIG. 8, in accordance with one embodiment.
Figure 10:
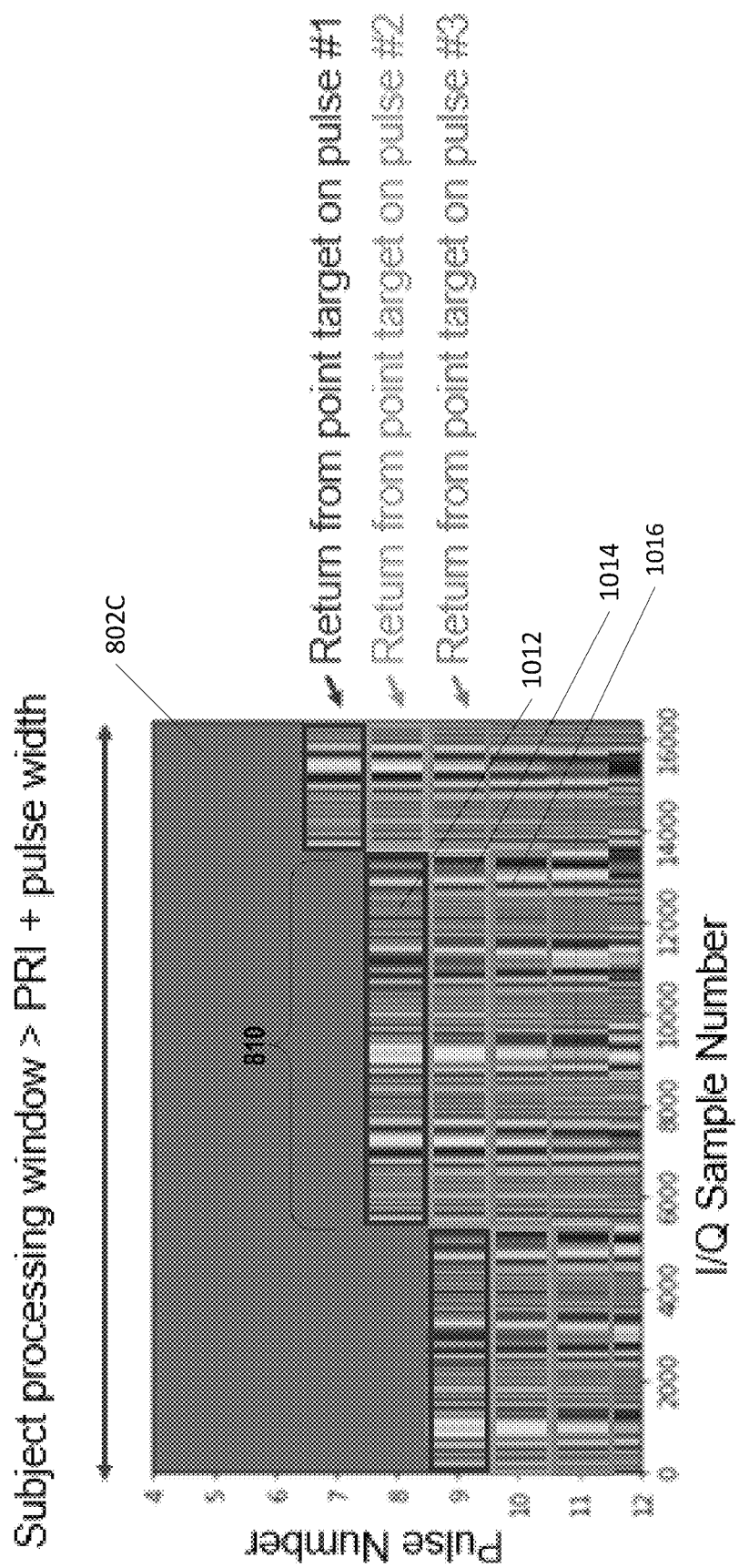
FIG. 10 is an exemplary graph of an expansion and overlap of the conventional processing window of FIG. 8, in accordance with one embodiment.

Referring to the method FIG. 7 and also exemplary FIGS. 8-10, consider an example radar system, where the radar system is transmitting, towards a given scene, a burst of pulses that are all substantially back to back, with a predetermined duty factor (block 710). In one exemplary embodiment, the duty factor is 100%, but this is not limiting. For example, in an exemplary radar system, a radar transmitter transmits out thousands of such pulses, without turning off, and then switches off, and a receiver turns on and receives back all the radar returns associated with the thousands of pulses that were transmitted out, and the received pulses are all recorded, in a conventional system, as part of one long receive window, also referred to as a one dimensional record, which can be several minutes in length. Thus, for example, in block 715, in some embodiments, the radar return is received and processed (e.g., digitized by direct radio frequency (RF) sampling) as a one dimensional record which can be several minutes in length. In at least some types of conventional range-Doppler processing, the data are not recorded in a single contiguous 1-D array. Rather, data arrive in pulses because the radar is continually alternating between transmitting and receiving. Thus, after the radar transmits a pulse, it records the returns from that pulse. In at least some types of conventional range-Doppler processing, the corresponding data record is often also referred to as a pulse.

Referring again to FIG. 7, in block 720, an expanded processing window is defined (block 720) that contains one unbroken return from any point target or scatterer in the scene; e.g., instead of a width W of the window being defined as W=Pulse repetition interval (PRI), the expanded processing window is defined such that W>PRI+pulsewidth. FIGS. 8 and 9, discussed further below, help to illustrate a comparison between a conventional processing window (FIG. 8) and an expansion and overlap of the conventional processing window (FIG. 9).

Referring briefly to FIG. 8, FIG. 8 is an exemplary graph 800 of a conventional processing window 804A, in accordance with one embodiment, showing received data organized into pulses. It can be seen that the conventional first processing window 802A has a first processing window width 804A equivalent to the entire pulse repetition interval (PRI), which in this example has a length that extends to approximately 8000 UQ samples. As FIG. 8 shows, the conventional processing window 802A contains fragments from several different pulses (e.g., in FIG. 8, shown as "return from point target of pulse #1", "return from point target of pulse #2," and "return from point target of pulse #3.") This is due to the 100% duty factor of the pulse waveform, which results in phase discontinuity and artifacts In accordance with at least some embodiments herein, to help overcome the issues with phase discontinuity and artifacts, especially in attempting to process returns of high duty factor waveforms, a process is used which can help to ensure that a processing window 802 is able to contain an entire unbroken return from a point target. This is done, in certain embodiments, by defining an expanded processing window (block 720), to ensure that the expanded processing window contains one unbroken return from any point target. For example, referring briefly to FIG. 9, FIG. 9 is an exemplary graph 900 wherein the processing window length 804B contains an added new processing window 802B, which is a processing window that is actually an expansion of the conventional processing window 802A of FIG. 8, in accordance with one embodiment. That is, instead of width 804A of the processing window being defined to be W=PRI (as in FIG. 8), the width 804B of the expanded processing window is defined to be width W>PRI+Pulsewidth (block 720 of FIG. 7). This is an example, in one embodiment of an expanded processing window.

For example, referring to FIGS. 7-9, in FIG. 9, in accordance with block 720, an expanded processing window 802B is defined, wherein the window 802B has a length of W (as defined above), where the window is effectively "slid" along the long one dimensional data record (received at block 715), one pulse repetition interval (PRI) at a time (block 730), wherein at each "stop" of the window, data are copied from the window into a two-dimensional array whose dimensions are range sample number and pulse number so that the contents of the $n^{th}$ window are copied into the $n^{th}$ pulse of the 2-D array (block 735). As can be seen in FIG. 9, the subject processing window 804B includes the original processing window 802A and a copy 802B of the original processing window, such that the subject processing window, as an expanded window, has a length of 16000 UQ samples.

As another example to illustrate what is happening in the process of FIG. 7, consider, FIG. 10, which is an exemplary graph 1000 for one embodiment of an expansion and overlap of the conventional processing window of FIG. 8, in accordance with the process of FIG. 7, to achieve the expanded processing window of FIG. 9. FIG. 10 helps to illustrate that the subject processing window 802c contains one unbroken return 810 from the point target, resulting in proper focusing. FIG. 9 illustrates how the overlapping results in a block of data on the left are a copy of a block of data on the right. In the example in FIG. 10 (which shows another view of the same data), the overlapped processing windows 802c actually includes three unbroken returns (1012, 1014, 1016) for the point target: one from each of pulse #1 (1012), pulse #2 (1014), and pulse #3 (1016). In practice, the 2-D array could include thousands of unbroken returns from each target or scatterer in the scene. FIG. 10 illustrates that, in certain embodiments, each expanded receive window will always contain an unbroken return from an arbitrary point target, as well as two fragments (note that these fragments, in certain embodiments, are not important for processing and can be discarded in the subsequent range windowing, discussed further herein in connection with block 545 and FIG. 16). Furthermore, the unbroken returns from a sequence of pulses show up sequentially in the sequence of range windows, enabling the processing to associate a pulse number with each range window.

Referring again to FIGS. 7-9, at block 735, for each increment of the window, the contents are copied into a two-dimensional (2-D) array whose dimensions are range sample # and pulse #, so that the contents of the nth window are copied into the nth pulse of the 2-D array. Thus, each time that the window is slid and its contents are copied into the 2-D array (as discussed above), the process fills in one pulse of the 2-D array. The copying of data from the window of width W into one dimension of a 2-D array, effectively copies the data into a range dimension of a 2-D array, effectively creating a 2-D array having overlapped, received range data. The process of blocks 730-735 is repeated, sliding the window along the entire one-dimensional array, until the entire one-dimensional record is processed (block 745), and then processing returns to block 510 of FIG. 5 (block 750). Note that, in certain embodiments, once the size of the window is defined in block 720, the size remains fixed throughout the subsequent loop.

Figures 11A, 11B:
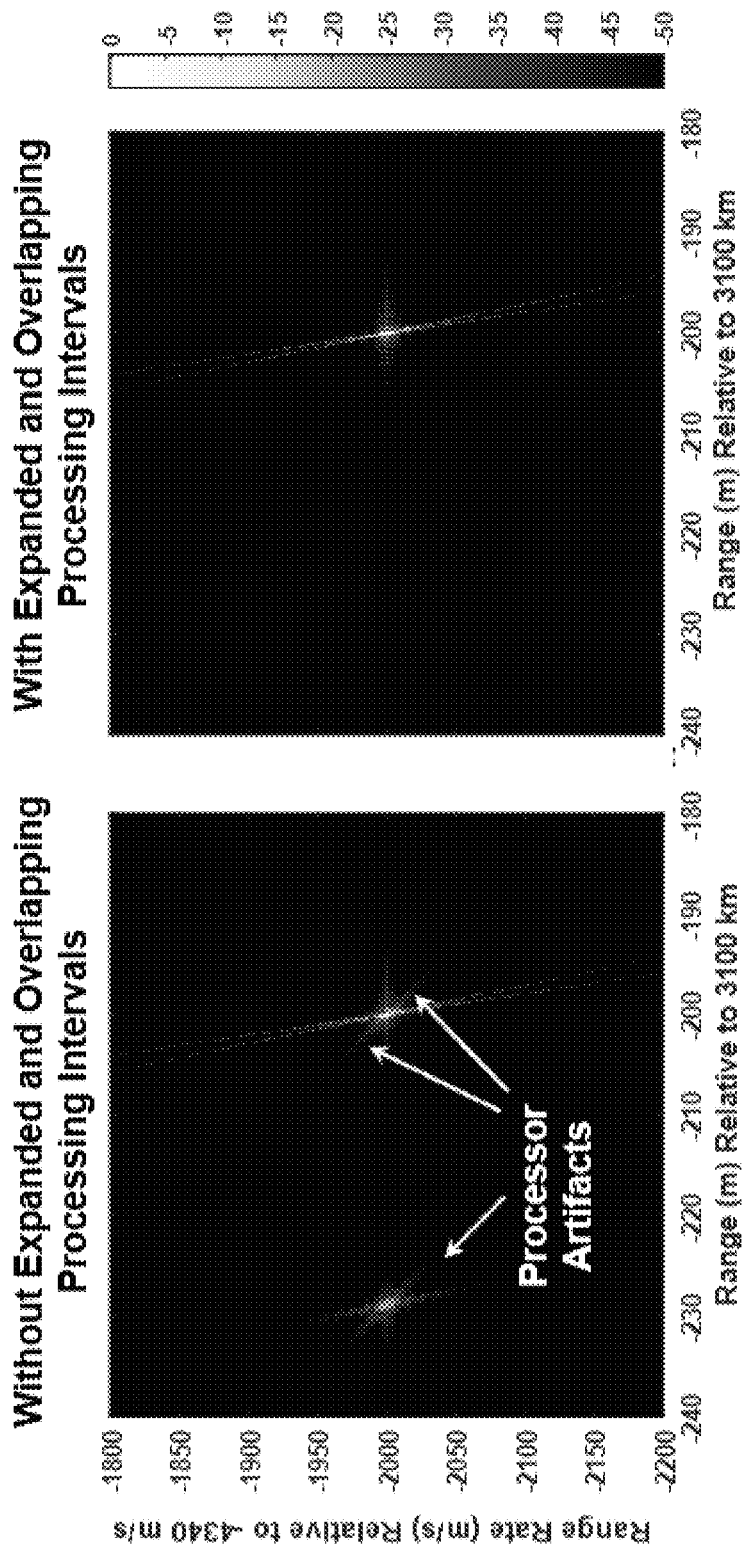
FIG. 11A is an exemplary range-Doppler map showing processor artifacts, in a configuration without expanded and overlapping processing intervals, in accordance with one embodiment.
FIG. 11B is an exemplary range-Doppler map showing the absence of processor artifacts, in a configuration with expanded and overlapping processing intervals, in accordance with one embodiment.

As an example of how the processing of the method of FIG. 7 works, FIG. 11A is an exemplary range-Doppler map showing processor artifacts, in a configuration without expanded and overlapping processing intervals, in accordance with one embodiment, and FIG. 11B is an exemplary range-Doppler map showing the absence of processor artifacts, in a configuration with expanded and overlapping processing intervals, in accordance with one embodiment. As a comparison between FIGS. 11A and 11B, the map in FIG. 11B, where expanded and overlapping processing intervals were used, shows an elimination of artifacts due to waveforms with high duty factor.

Figure 12:
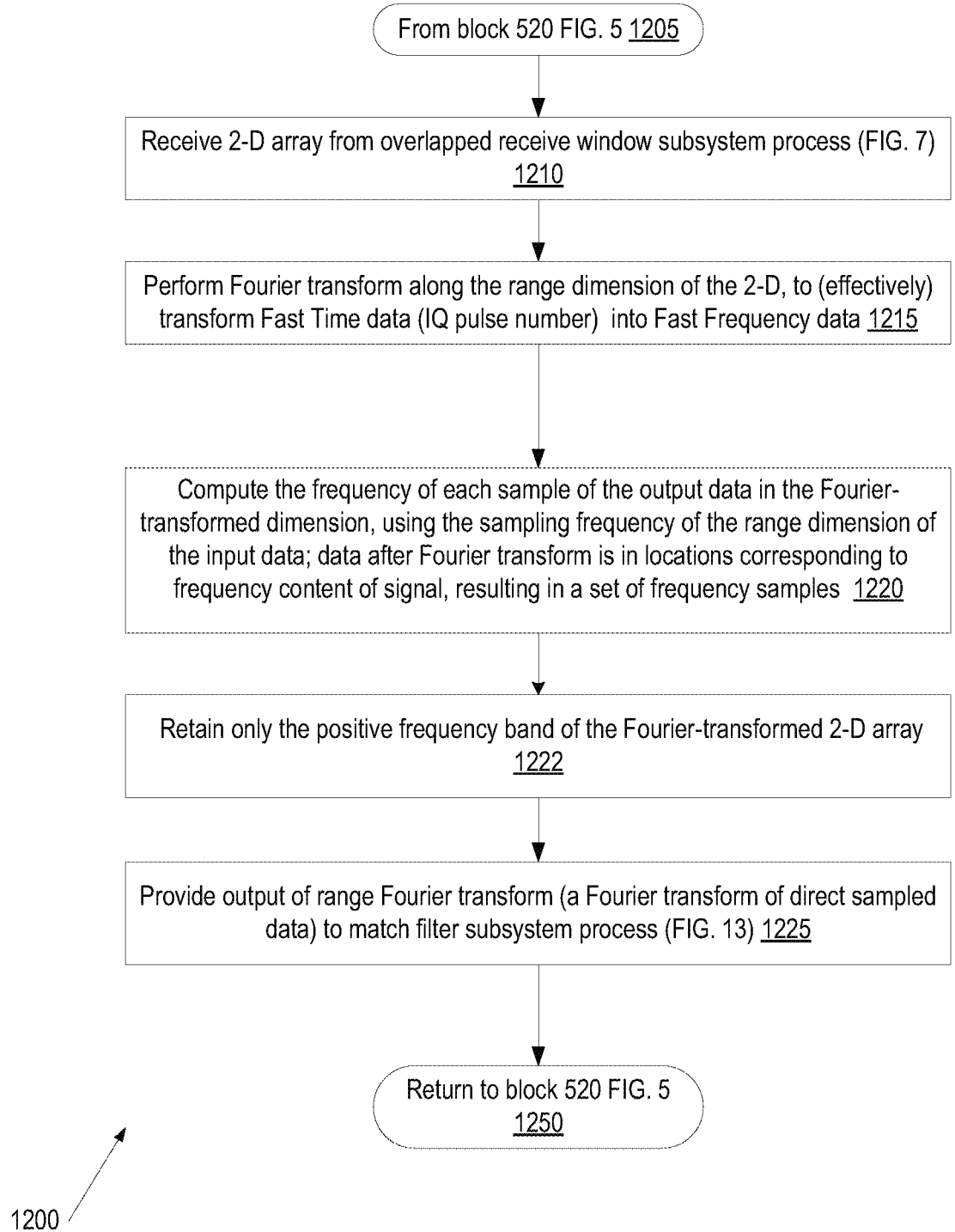
FIG. 12 is a flow chart for a first method of performing a range Fourier transform, in accordance with one embodiment.

Referring again to FIGS. 5 and 7, the output of the method of FIG. 7 (a 2-D array) is returned at block 510, and the method 500 of FIG. 5 proceeds to perform a range Fourier transform (block 515), which is detailed further in FIG. 12, which is a flow chart for a first method 1200 of performing a range Fourier transform, in accordance with one embodiment. Referring briefly to FIG. 12, a 2-D array is received from the overlapped receive window subsystem process of FIG. 7 (block 1210). In an example embodiment, the two dimensions of the 2-D array are Fast Time (corresponding to UQ sample number, if referring to the example data in FIG. 10, and the second dimension is Slow Time (corresponding to the Pulse number). A Fourier transform is performed along the fast-time (i.e., range) dimension of the 2-D array (block 1215). For example, if referring to the example data FIG. 10, the operation would be performed only on the rows of data in that subject processing window. Using the sampling frequency of the range dimension of the input data, in the next block, the frequency of each sample of the output data is computed, in the Fourier-transformed dimension, using the sampling frequency of the range dimension of the input data (block 1220). Note that the data after Fourier transform is in locations corresponding to frequency content of the signal, resulting in a set of frequency samples. Next, in an example embodiment, the waveform and mocomp parameters are used to compute the upper and lower limits of the positive frequency band of the received signal, and only this band (the positive frequency band) of the Fourier-transformed 2-D array (from block 1215) is retained (block 1222). The samples outside of the positive frequency band, including those out of band and also those in the negative frequency band, are discarded, thereby significantly reducing the number of samples for subsequent processing and also eliminating the effects of out-of-band noise and interference (block 1222). The resulting 2-D data array is output to the matched filter subsystem process (FIG. 14, described further below) (block 1225). So, each sample of the output in the horizontal dimension (FIG. 10), after the Range Fourier Transform of block 515, now represents the frequency. Then processing returns (block 1250) to block 520 of FIG. 5.

Referring again to FIG. 5, when processing returns at block 520, after the range Fourier transform of block 515, processing moves on to filter the output of the range Fourier transform using a matched filter (e.g., filter subsystem 412 of FIG. 4), which thus operates on a Fourier transform of the direct sampled target data. In certain embodiments, one general idea behind the matched filter is that, for a given point target, the point target will cause a certain response in phase, such as a modulation or shift, which will be part of the output of the range Fourier transform (block 515). By being able to model that phase response in an analytical model, like in an equation, it can be possible to reverse/offset that phase, to achieve a result with, effectively, no phase modulations on it. In certain embodiments, as discussed below, the matched filter is able to remove the phase modulations. Thus, when a later inverse Fourier transform is taken in range (block 535, discussed further herein as well as block 590), then, if phase modulations have been removed, the result will compress to something that is, substantially, a single point in the range dimension. Furthermore, as will be appreciated by one of skill in the art, in accordance with the process of FIG. 5, even targets not at the reference range will still compress in range. In addition, as will be shown below in connection with block 525 and FIG. 13, the matched filter subsystem 412 removes the range rate of the reference target. Further, the residual range rate of targets/scatterers not at the reference range rate, is used by subsequent processing to locate them (the targets/scatterers not at the reference range rate) in range rate.

Figure 13:
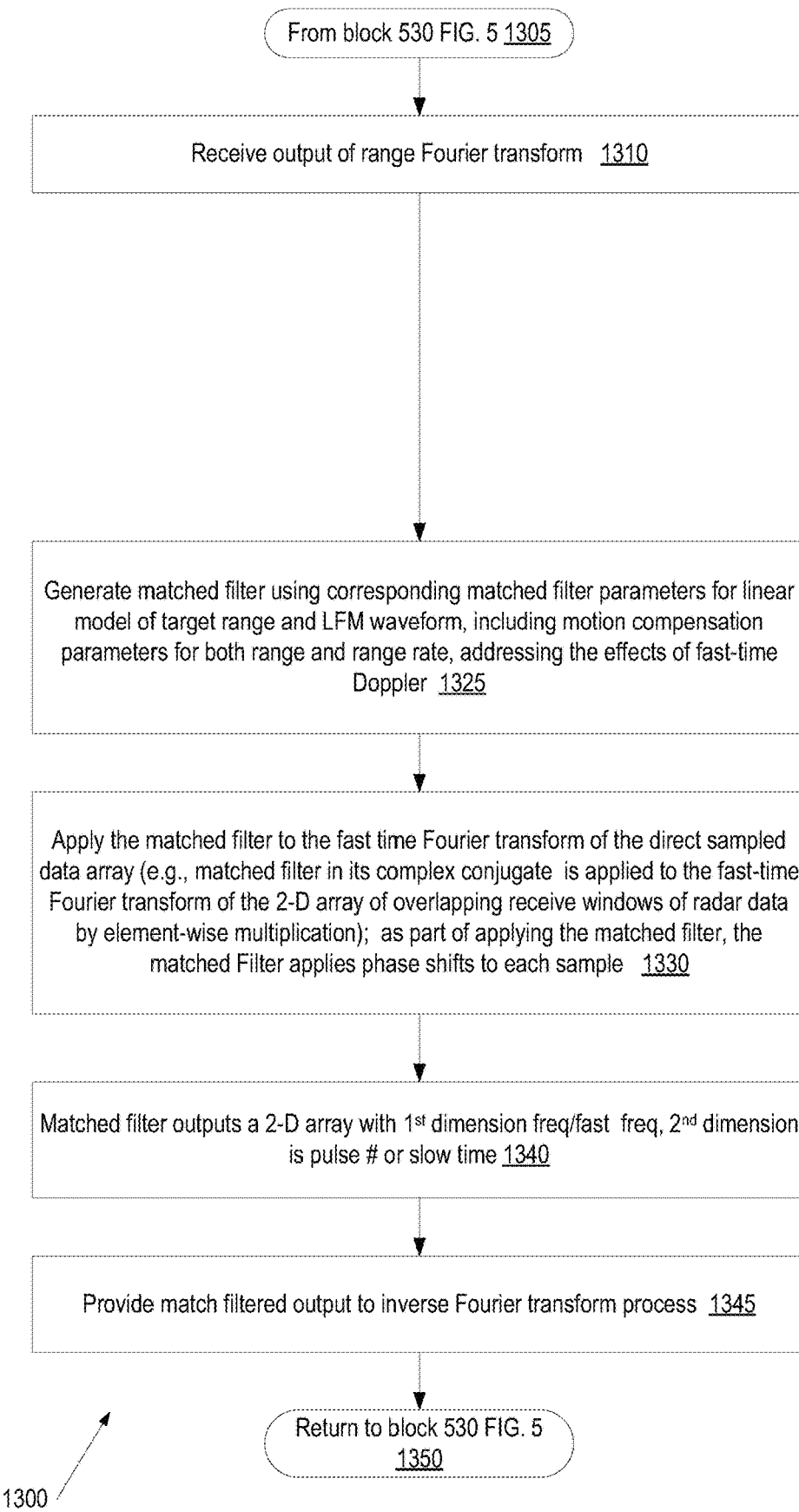
FIG. 13 is a flow chart of a method for providing a matched filter, in accordance with one embodiment.
Figure 15:
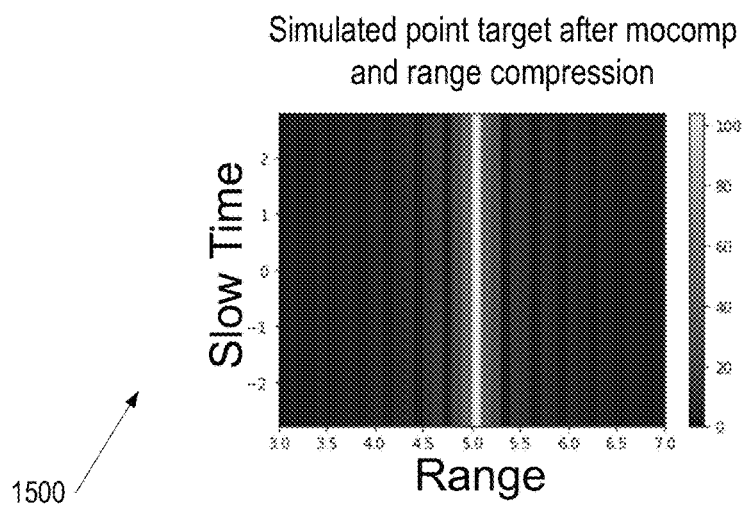
FIG. 15 is an exemplary graph showing the output of the method of FIG. 14, a simulated point target after motion compensation and range compression, in accordance with one embodiment.

Referring to FIGS. 5 and 15, after processing returns from block 520, processing proceeds to block 525, wherein the data are filtered using a matched filter, using the process of FIG. 13 (block 530). FIG. 13 is a flow chart of a method 1300 for providing a matched filter for the matched filter subsystem 412 and the method of FIG. 5, in accordance with one embodiment. In certain embodiments, the matched filter is based on a model of target range that is linear in time, and the matched filter assumes a linear frequency modulated (LFM) waveform. In certain embodiments, the matched filter is configured to create a motion model for a hypothetical or reference point target at a predetermined location in or within a given scene, such as a location that is at the approximate center of a scene (i.e., at or substantially near the center of the scene, not required to be at an "exact" center of a scene but can, in certain embodiments, be at an exact center of a scene) where the motion model is based on several factors, including the output of the receive window subsystem and a set of motion compensation parameters for range and range rate. In certain embodiments, the matched filter is configured to compensate for at least some effects of fast time Doppler on the target.

As discussed above and also further below, the matched filter includes motion compensation ("mocomp") parameters for both range and range rate, addressing the effects of fast-time Doppler. In certain embodiments, the matched filter provides features not seen in the art, because the matched filter: 1) operates not on deramped data (i.e., data where the received signal is mixed with a reference signal in order to reduce the required digital sampling rate) or stretch data as is usually the case for radars that use LFM wave forms but rather on fast frequency data; 2) applies overlapping windows (generated in block 505) to efficiently transform the direct sampled data to fast frequency without introducing phase discontinuities that otherwise occur with high duty factor pulse burst waveforms; and 3) incorporates a motion model for targets with high range rates.

Referring to FIG. 13, the matched filter process starts with receiving the output of the range Fourier transform process of FIG. 12 (block 1310). In block 1325, a matched filter is generated using parameters for a linear model of target range and for the LFM waveform, including motion compensation parameters for both range and range rate, addressing the effects of fast-time Doppler. For example, in one embodiment, the matched filter in the fast frequency domain is given by $$H(v,n)=e^{i2\pi\phi_H(v,n)}$$

where v is fast frequency in cycles/sample, n is pulse number, $i=\sqrt{-1}$ is the imaginary unit, e is Euler's constant, and the matched filter phase is given by $$\phi_H(v,n) = f_c[t_{kd}(v) + \tau_{pr}n] + \frac{\gamma}{2}t_{kd}^2(v) - vk^*(v,n)$$

where $f_c$ is the LFM waveform center frequency, $\gamma$ is the LFM waveform chirp slope, $\tau_{pr}$ is the pulse repetition interval (PRI), and the time associated with the point of stationary phase is given by $$t_{kd}(v) = \frac{v}{\gamma(1-\beta)\Delta t_{a/d}} - \frac{f_c}{\gamma}$$

where $\Delta t_{a/d}$ is the analog-to-digital sampling interval and the Doppler scale factor is given by $$\beta = \frac{2\dot{r}_t}{c}$$

where $\dot{r}_t$ is the range rate of the mocomp point (or target), c is the speed of light, and the fast time sample number of the point of stationary phase is given by $$k^*(v,n) = -\frac{\tau_D}{\Delta t_{a/d}} + \frac{t_R + \beta\tau_{pr}n + t_{kd}(v)}{(1-\beta)\Delta t_{a/d}}$$

where $\tau_D$ is the time delay between the start of the radar transmission and the start of the receive window and the round-trip time to the mocomp point at the start of the radar transmission is given by $$t_R = \frac{2R_{t0}}{c}$$

where $R_{t0}$ is the range to the mocomp point (or target) at the start of the radar transmission. The matched filter above is based 1) on the following model for the phase of the transmitted LFM waveform $$\phi_T = f_c(t-t_0) + \frac{\gamma}{2}(t-t_0-\tau_{pr}n)^2$$

where $t_0$ is the start time of the radar transmission, 2) on the following model for the range of the mocomp point, which provides a reference point for the target or the scene $$R_t(t)=R_{t0}+\dot{r}_t(t-t_0)$$

and 3) on the following model for the discrete time sampling of the radar receiver $$t(k,n)=\Delta t_{a/d}k+\tau_{pr}n+\tau_D+t_0.$$

The matched filter in the example embodiment above was derived by applying the three models identified above to obtain a model the phase of the signal received from an ideal or reference point target at the mocomp point and then applying the principle of stationary phase to evaluate the fast-time Fourier transform of the received signal. It should be understood that the example embodiment of the matched filter provided above is not intended to be limiting. It is expected that those of skill in the art will be able to design other types of matched filters that meet the requirements of at least some embodiments herein, based on the information given above and also information elsewhere herein.

Referring still to FIG. 13, the matched filter in its complex conjugate $H^*(v,n)=e^{-i2\pi\phi_H(v,n)}$ is applied to the fast-time Fourier transform of the 2-D array of overlapping receive windows of radar data by element-wise multiplication (block 1330). The matched filter output is a 2-D array with dimensions of fast frequency and pulse number (also known as slow time) (block 1340). This 2-D array is provided (block 1345) to the inverse Fourier transform subsystem 413 (block 540), which is configured to implement the method of FIG. 14, which is a flow chart of a method 1400 of performing an range compression inverse Fourier transform on the output of the matched filter, in accordance with one embodiment, wherein the output of this inverse Fourier transform is range compressed data that are the result of both the match filtering and the inverse Fourier transform.

Figure 14:
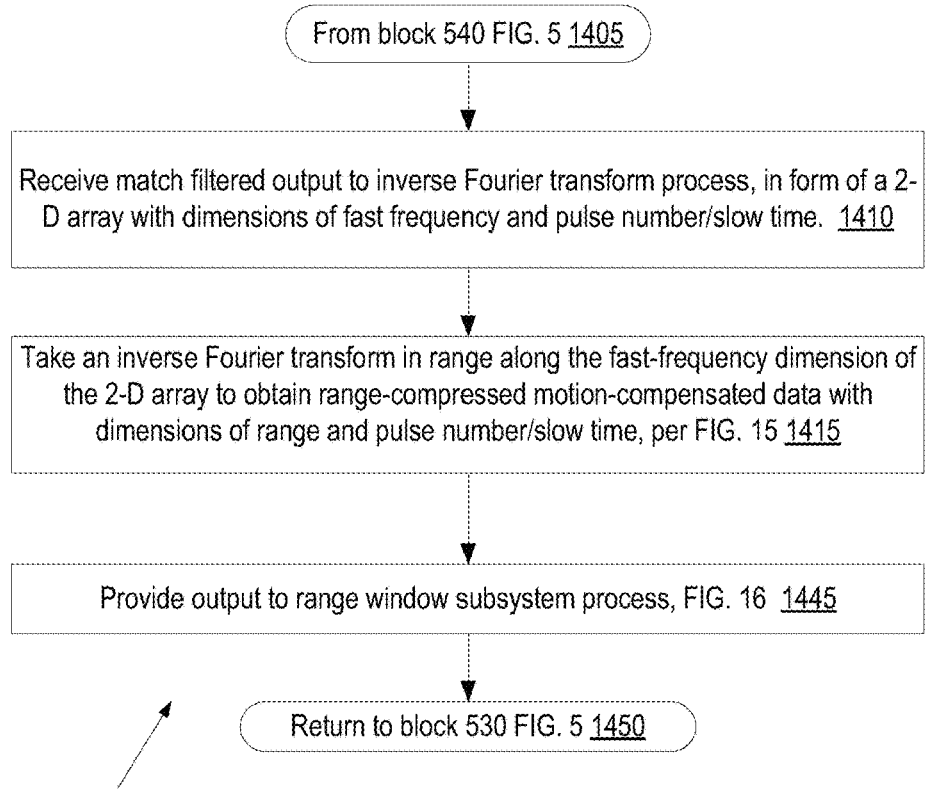
FIG. 14 is a flow chart of a method of performing a range compression inverse Fourier transform, in accordance with one embodiment.

Referring to FIG. 14, the output of the match filter is received, in the form of a 2-D array with dimensions of fast frequency and pulse number/slow time (block 1410). An inverse Fourier transform is taken along the fast-frequency dimension of the 2-D array (block 1415) to obtain range-compressed motion-compensated data with dimensions of range and pulse number (or, equivalently, slow time), as seen in FIG. 15, which is an exemplary graph 1500 showing the output of the method of FIG. 14 with a simulated point target after motion compensations and range compression. In the simulated example of FIG. 15, the simulated point target lies along the five (5) meter line in the graph, being a range of five meters relative to the reference range (this is not limiting), and, in this simulation, that is because the simulated target had a range rate that matches the range rate parameter that was input to the matched filter. However, generally, if the range rate of the target mismatches a range rate parameter input to the matched filter, then the plot of FIG. 15 would show range walk, e.g., range could be walking from left to right in slow time (or from right to left), as those of skill in the art will appreciate.

Figure 16:
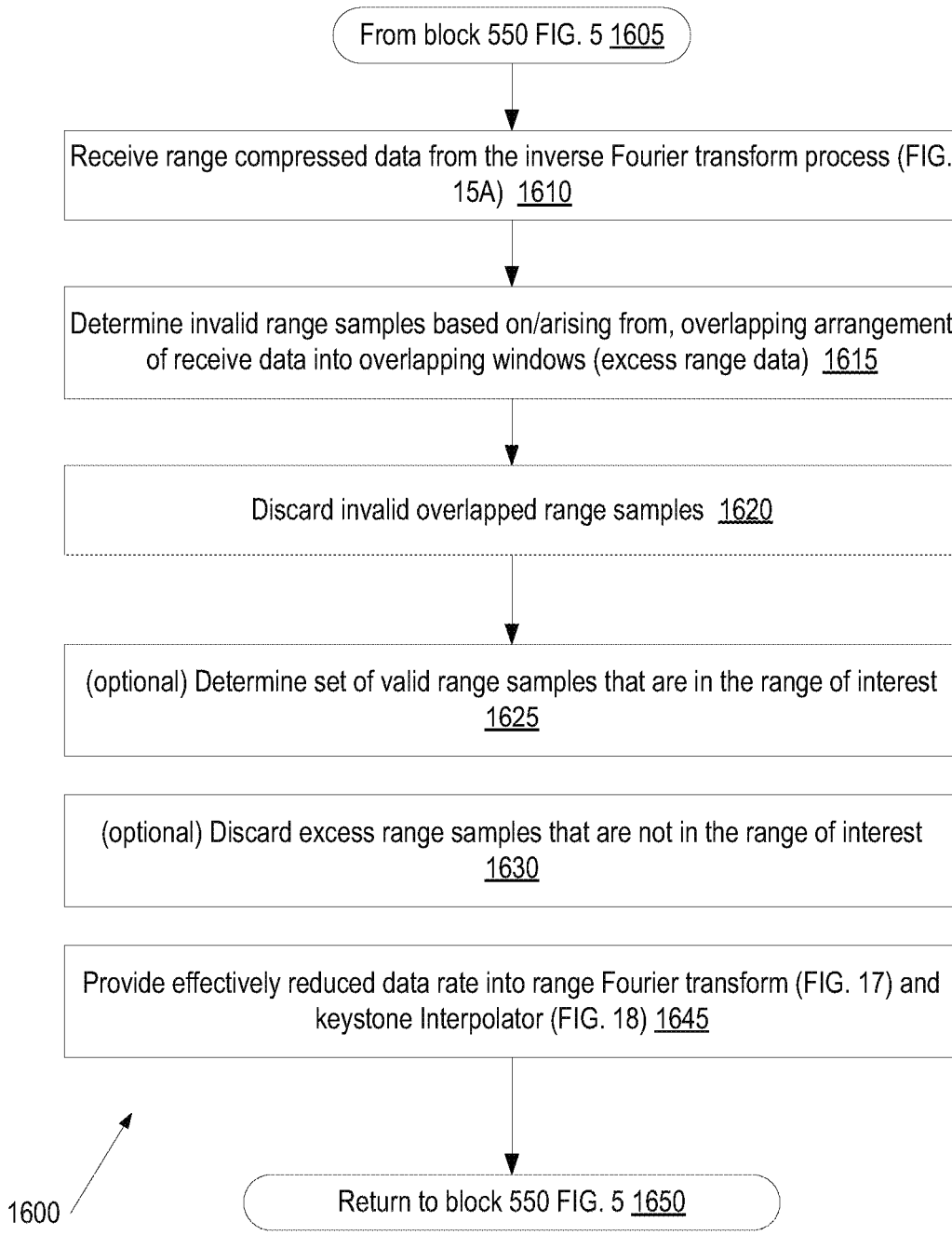
FIG. 16 is a flow chart of a method of providing range windowing, in accordance with one embodiment.

After the range compression inverse Fourier transform of FIG. 14 is completed, its output is provided (block 1445) to the range window subsystem 418, which is configured to implement the range window method of FIG. 16 (via blocks 1450 and FIG. 5 blocks 545-550), which is a flow chart of a method 1600 of providing range windowing, in accordance with one embodiment. The range windowing method 1600, in certain embodiments, is configured to reduce data rate into the keystone interpolator subsystem 420 (and process, discussed further herein in connection with FIGS. 18-22) by discarding invalid range samples arising from arrangement of receive data into overlapping windows and by discarding any valid range samples that are not of interest.

Referring to FIG. 16, the method 1600 receives range-compressed data from the inverse Fourier transform process of FIG. 15A (block 1610). Invalid range samples are determined, based on and/or arising from, an overlapping arrangement of receive data into overlapping windows (i.e.,  excess range data) block 1615. Recall that, in block 505, the method of FIG. 5 formed an overlapped receive window, where the method of FIG. 7 (to accomplish this) involved making copies of data and building the set of copies into a two-dimensional array. For any target, with the forming of the overlapped receive window, there was an entire return that falls inside of the first dimension of the 2-D array. However, because of the copying of data, and the adjusted width of the processing window width (e.g., as shown in FIGS. 8-10), one result is that the data have a range which is longer than the pulse repetition interval (PRI). Thus, for the input to the range window process (i.e., which is the output of the range compression inverse Fourier transform at block 1610), only one PRI of that range dimension is valid. The rest of that range dimension contains excess, unneeded information that is simply left over from the way that block 505 constructed this two-dimensional array. Thus, in blocks 1615-1625, the range windowing process of FIG. 16 discards the invalid/inapplicable parts of the range dimension, to help reduce the data rate into the keystone interpolator (block 565, discussed later herein).

Accordingly, after determining the invalid range samples (block 1615), the excess or invalid overlapped range samples are discarded (block 1620), based on the range dimension that corresponds to the PRI. In certain embodiments, the process of FIG. 16 includes an optional step of determining a set of valid range samples that are in the range of interest (block 1625) and discarding the rest (block 1630). For example, optionally, if a user, application, or other entity is only interested in only a subset of the ranges, there can be further range windowing, if desired, to limit the ranges to a desired sub-interval. Note that, this range windowing is necessitated, in certain embodiments, by the overlapped receive window (block 505), and if that action was not performed, in certain embodiments it would not be necessary to perform the range windowing of block 545. However, the range windowing of FIG. 16 is advantageous to help provide an effectively reduced data rate into the range Fourier transform (FIG. 17) and later to the keystone interpolator (FIG. 18) (block 1645). When the processing of FIG. 16 is complete, processing returns to block 550 of FIG. 5 (block 1650).

Figure 17:
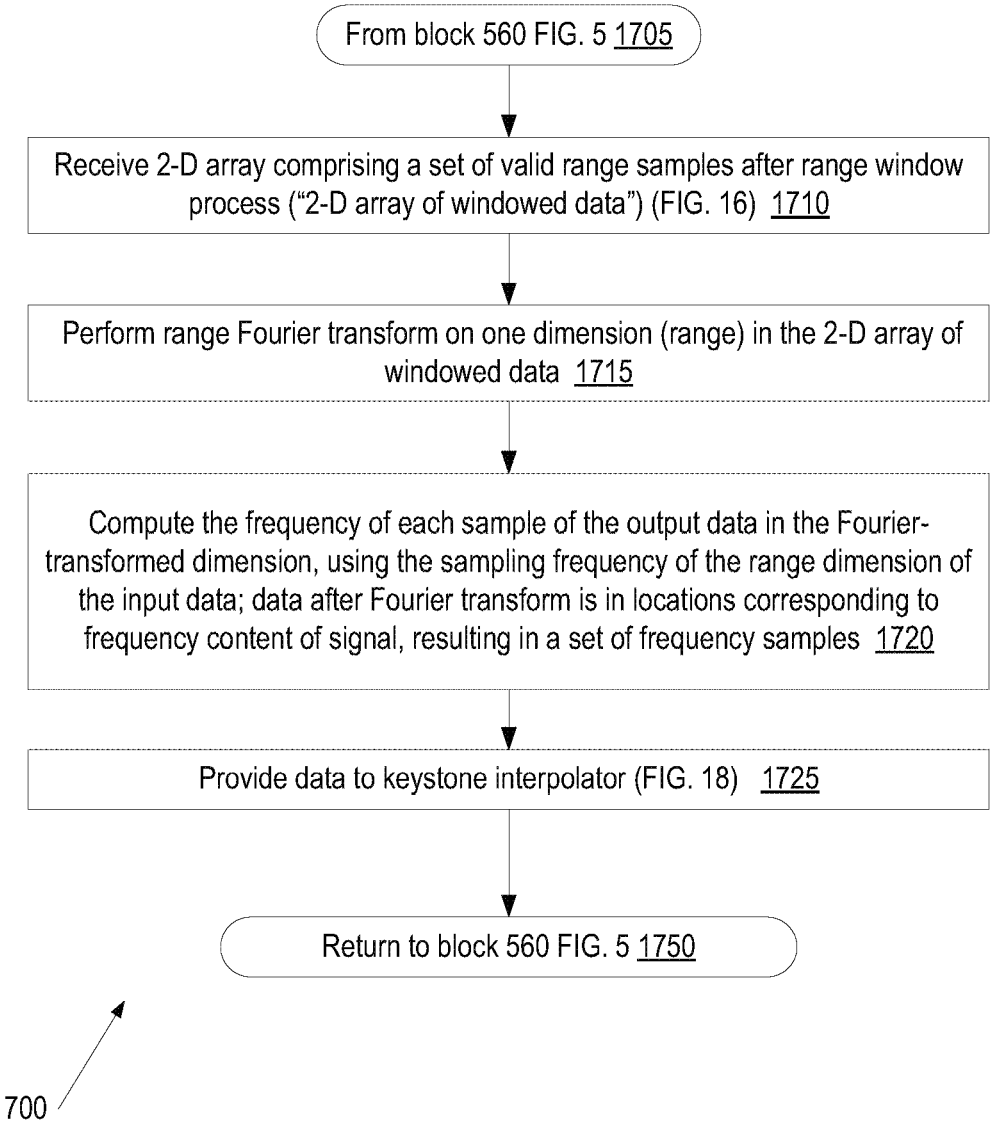
FIG. 17 is a flow chart of a second method of providing a range Fourier transform, in accordance with one embodiment.

Referring again to FIG. 5, after range windowing (block 545), a range Fourier transform is performed (block 555), where processing moves to FIG. 17 (block 560). FIG. 17 is a flow chart of a second method 1700 of providing a range Fourier transform, in accordance with one embodiment, where the second method 1700 is configured for the output of the range window process. FIG. 17, like FIG. 13, describes an application of a range Fourier transform. Referring to FIG. 17, data are received after the range window process of block 545, where the data include 2-D array comprising a set of valid range samples after the range window process ("2-D array of windowed data") (block 1710). A range Fourier transform is performed (block 1715) on one dimension (range) in the 2-D array of windowed data after the range window process, after which the data are in locations corresponding to the frequency content of the signal, resulting in a set of frequency samples (block 1720). These data are then provided to the keystone interpolator subsystem 420 (block 1725), and processing returns to block 450 of FIG. 5 (block 1650).

Figure 6:
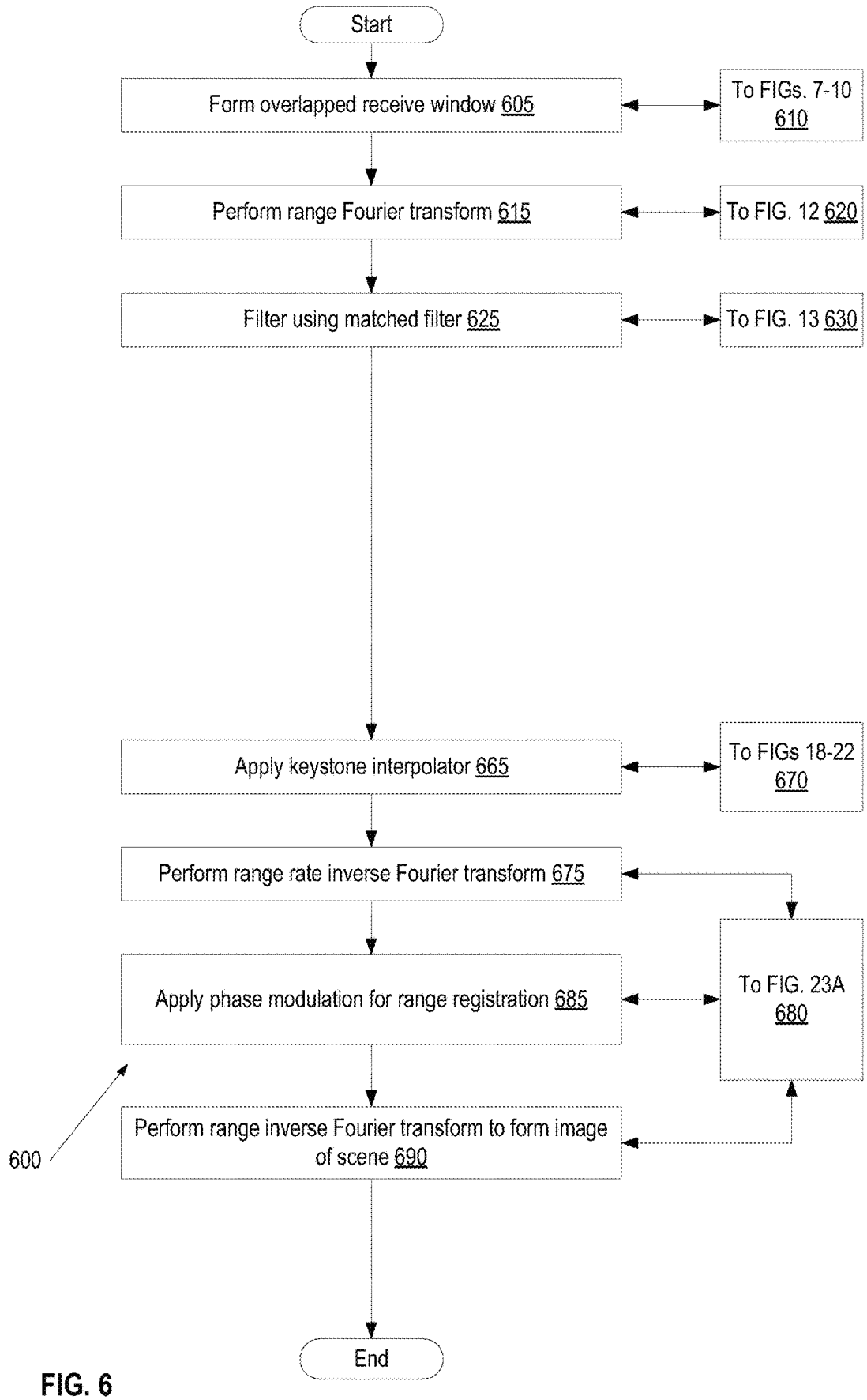
FIG. 6 is a second high-level flow chart detailing a method of operation of the range-Doppler processing system of FIG. 4, in accordance with one embodiment.

In an alternate embodiment to the process of FIG. 5, as shown in FIG. 6 (to which reference is briefly made), it is possible, in certain embodiments to have a process that goes directly from the matched filter (block 635) to the keystone interpolator (block 665, and which is also discussed below in connection with block 565 of FIG. 5). FIG. 6 is a second high-level flow chart 600 detailing a method of operation of the range-Doppler processing system of FIG. 4, in accordance with one embodiment. As can be seen, the blocks are analogous to correspondingly numbered blocks in FIG. 5, so the description is not repeated for identical blocks. However, in this alternate process of FIG. 6, several processing steps of FIG. 5 are skipped or eliminated, including the range compression inverse Fourier transform (block 535), the range windowing (block 545) and the range Fourier transform (block 555). This is workable, but less advantageous than the method of FIG. 5, because the keystone interpolator is the most "expensive" part computationally of this processing. Without the range windowing, the keystone interpolation may have to perform at least twice as many interpolation operations as is necessary. That is why the method of FIG. 5, in certain embodiments, can reduce computational cost, because the intervening steps of taking the inverse range Fourier transform (block 545), range windowing (block 545), and taking range Fourier transform again (block 555) help to produce a much smaller array that the keystone interpolation has to interpolate on, and this helps save computation resources.

Figure 18:
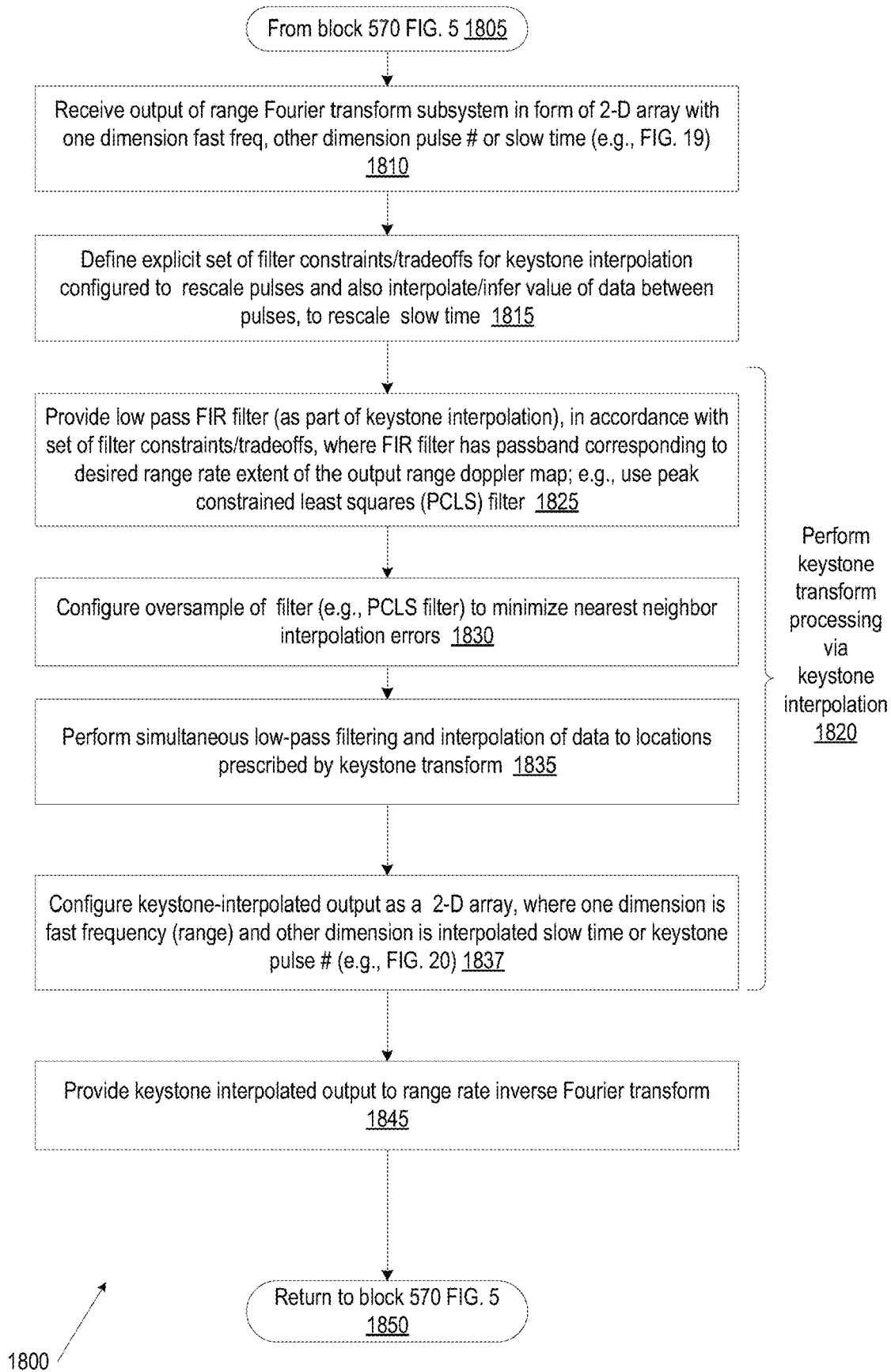
FIG. 18 is a flow chart of a method of providing a Keystone interpolator, in accordance with one embodiment.

Referring again to FIG. 5, after the range Fourier transform of block 555, processing moves on to apply a keystone interpolator to the data, where FIG. 18 is a flow chart of a method 1800 of providing a keystone interpolator, in accordance with one embodiment. The keystone interpolator helps to provide variable rate resampling in the pulse number direction. Keystone processing itself is a known technique for processing data such as SAR data. An example of keystone processing as applied in a radar system is described, for example, in commonly assigned U.S. Pat. No. 7,969,345 ("FAST IMPLEMENTATION OF A MAXIMUM LIKELIHOOD ALGORITHM FOR THE ESTIMATION OF TARGET MOTION PARAMETERS") (hereinafter "345 patent"), which is incorporated by reference. As the 345 patent notes, a keystone formatting operation above is essentially a one-dimensional interpolation of the Fourier-transformed (in slow-time) radar data, where keystone mapping parameters are independent of the unknown target motion, depending only on the known radar sensor parameters. One advantageous feature of the keystone transform is that it can effectively provide an interpolation between pulses to achieve a rescaling of so-called "slow time". In some embodiments, a keystone transform can be attractive because it does not assume a priori knowledge of any target velocity, nor does it rely on per-target tracking or estimation. The slow-time interpolation/slow-time rescaling/range velocity rescaling (e.g., keystone transform) removes frequency-velocity coupling by rescaling the slow-time axis as a function of fast-time frequency.

Referring to FIG. 18, the keystone interpolator method receives, as an input, the output of the range Fourier transform subsystem 410 in the form of a 2-D array, with one of the two dimensions being fast frequency, and the other dimension being pulse number or slow time (block 1810). In certain embodiments, a keystone interpolation process needs to interpolate or infer the value of the data in between any two given samples and map the samples to a different, pre-specified grid, to achieve rescaling of slow time. Thus, in block 1815, an explicit set of filter constraints/tradeoffs for keystone interpolation, are defined. These constraints/tradeoffs are configured so that the filter will rescale pulses and also interpolate/infer value of data between pulses, to rescale slow time. Bracket 1820, in the flow chart 1800, shows the elements of an overall sub-process in FIG. 18 of performing keystone transform processing via keystone interpolation, wherein blocks 1825-1837 all make up the actions (sub processes) that take place, advantageously all at the same time, as part of the high-level step of performing keystone transform processing via keystone interpolation. The sub processes 1825-1837 are shown separately in FIG. 18 for simplicity of explanation.

In block 1825, as part of the keystone transform processing and keystone interpolation, a low pass finite impulse response (FIR) filter is provided, in accordance with the set of filter constraints/tradeoffs defined in block 1815. The FIR filter has a passband corresponding to a desired range rate extent of the output range-Doppler map. In certain embodiments, the low pass FIR filter is implemented using a peak constrained least squares (PCLS) filter, but this is not limiting. In certain embodiments, oversampling of the filter is configured to minimize nearest neighbor interpolation types of errors (block 1830). The filter simultaneously performs both low-pass filtering and interpolation of data, to the locations prescribed by the keystone transform (block 1835).

The output of the keystone interpolation method of FIG. 18 is configured to be a keystone-interpolated 2-D array, wherein one dimension is fast frequency (range) and the other dimension is an interpolated slow time or keystone pulse number (block 1837). After keystone interpolation, the slow time value of each sample in the 2-D array now depends on fast frequency; thus, the data no longer lie on a regular grid in slow time. The output of the keystone interpolation method of FIG. 18 is provided to the range rate inverse Fourier transform (block 1645), and processing returns to block 570 in FIG. 5 (block 1850).

Figure 20:
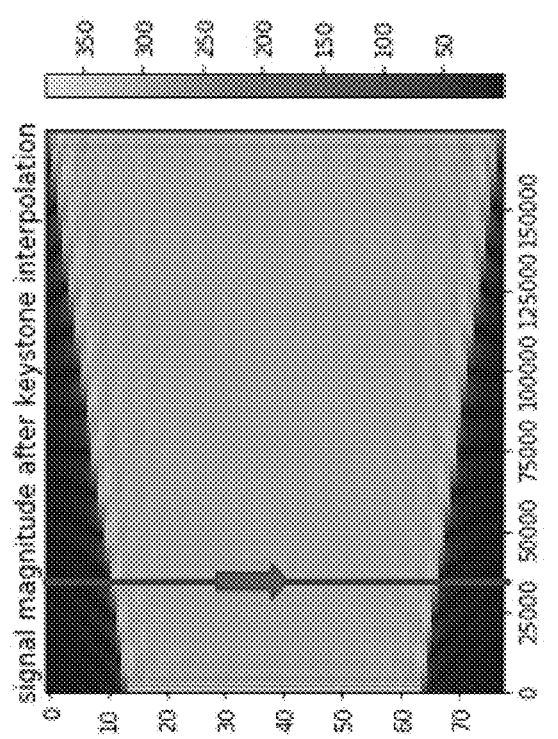
FIG. 20 is an exemplary graph showing a signal magnitude of the signal of FIG. 19, after a first type of interpolation is performed on the information in the exemplary graph of FIG. 19, in accordance with one embodiment.
Figure 19:
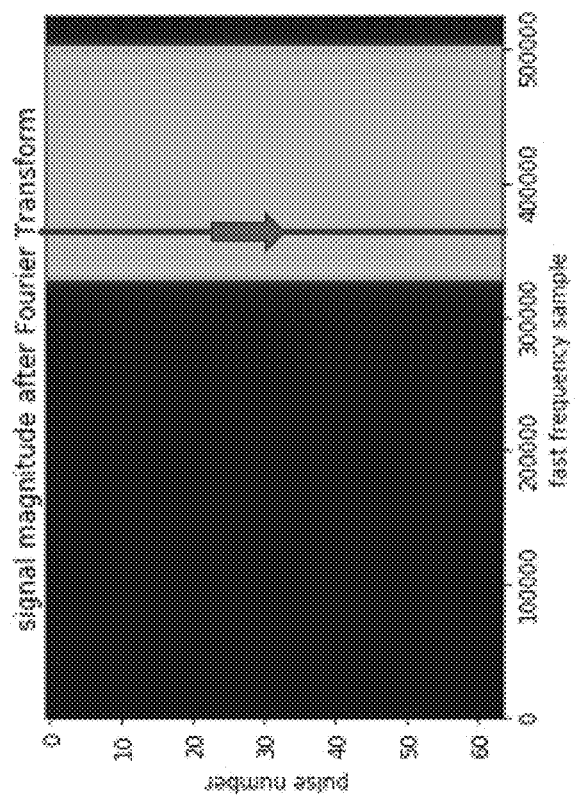
FIG. 19 is an exemplary graph showing a signal magnitude after the range Fourier transform of FIG. 17, in accordance with one embodiment.

Before moving on to the range rate inverse Fourier transform, consider an illustrative example of an input at block 1810, consider FIG. 19, which is an exemplary graph showing a signal magnitude after the range Fourier transform of FIG. 17, as an input to block 1810, in accordance with one embodiment. In FIG. 19, the vertical line with the arrow in it shows, from top to bottom, approximately 64 complex valued samples (corresponding to the pulse numbers) at the given Fast Frequency Sample. As discussed further above, keystone interpolation, as applied, e.g., to FIG. 20, can help to provide variable rate re-sampling in the pulse number direction. For example, FIG. 20 is an exemplary graph 1950 showing a signal magnitude of the signal of FIG. 19, after a keystone interpolation is performed, in accordance with one embodiment.

The keystone interpolator, in certain embodiments, can be implemented using any low-pass finite impulse response (FIR) filter with a passband corresponding to the desired range-rate (aka Doppler) extent of the output range-Doppler map (RDM). For example, the desired characteristics of this FIR filter can include: (a) a small impulse response length; (b) a narrow transition band; and (c) low stopband energy. A small/reduced impulse response length, as noted in (a), means that computation of each output sample of the interpolator requires fewer input samples. A reduced/narrow transition band, as noted in (b), means that fewer output samples are needed to represent the information. A low/reduced stopband energy level, as in (c), means that less energy from outside the desired range-rate extent of the output delay Doppler map (DDM) will end up aliasing into the DDM.

Thus, in certain embodiments, the three desired FIR filter characteristics (a), (b), and (c) above, promote computational efficiency and output product quality. However, as will be understood by those of skill in the art of digital filter design, the three FIR filter characteristics cannot be made arbitrarily low. In certain embodiments, the type of FIR filter that is used herein is the PCLS filter, which is described in Adams et al., *Peak-Constrained Least-Squares Optimization, IEEE Transactions on Signal Processing*, Vol. 46, No. 2, February 1998, at p. 306-321, which is incorporated by reference. However, as those of skill in the art will appreciate, other FIR filter design approaches, such as Parks-McClellan, may also be satisfactory in at least some embodiments.

Figure 21:
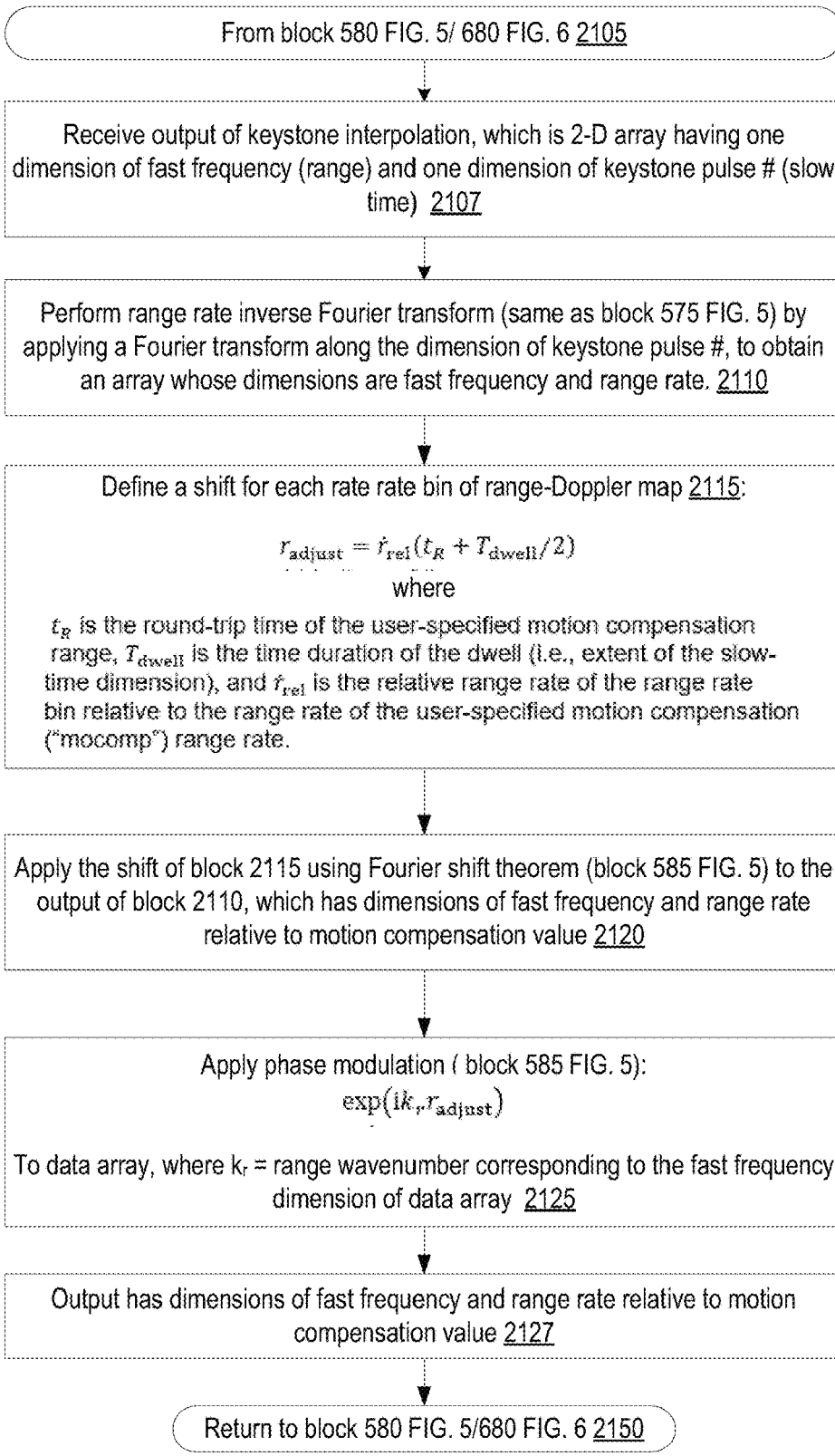
FIG. 21 is a flow chart showing a method for performing a range inverse Fourier transform and for applying phase modulation for range registration in accordance with one embodiment.

Referring again to FIG. 5, after processing returns from the keystone interpolation (block 545), a range rate inverse Fourier transform is performed (block 575). FIG. 21 is a flow chart showing a method 2100 for performing a range inverse Fourier transform and for applying phase modulation for range registration in accordance with one embodiment. Referring to FIG. 21, to start, the output of the keystone interpolation of FIG. 18, is received (block 2107) as an input (block 2107), wherein this received input is a 2-D array having one dimension of fast frequency (range) and one dimension of keystone pulse #(slow time). In block 2110, a range rate inverse Fourier transform is performed on the input. The inverse Fourier transform performed in block 2110 differs from the range rate inverse Fourier transform of block 575 of FIG. 5, because the inverse Fourier transform of block 2110 is performed along the other dimension, transforming keystone pulse number into range rate. That is, the 2-D inverse Fourier transform of block 2110 is applied only to the range rate dimension at this point, before applying modulations. Next, each range rate bin of the range-Doppler map needs to be shifted in range to be properly registered. In particular, as shown in block 2115 of FIG. 21, the shift $r_{adjust}$ is an advance in the amount of:

$$r_{adjust} = \dot{r}_{rel}\left(t_R + \frac{T_{dwell}}{2}\right)$$

where $T_{dwell}$ is the time duration of the dwell (i.e., extent of the slow-time dimension), and $\dot{r}_{rel}$ is the relative range rate of the range rate bin relative to $\dot{r}_r$. This adjustment is implemented and applied using the Fourier shift theorem (block 2120; this also includes the actions of block 585 in FIG. 5). In particular, the phase modulation $e^{ik_r r_{adjust}}$ is applied to the data array before the final inverse Fourier transform, where $k_r$ is the range wavenumber corresponding to the fast-frequency dimension of the data array (block 2125). The output of the process of FIG. 21 is a 2-D array with dimensions of fast frequency and range rate relative to motion compensation value (block 2127). By ensuring that the proper phase shifts are applied, after the final inverse Fourier transform is taken (block 590 of FIG. 5), the targets in any resulting image or map that is formed should show up in the correct locations. (For example, referring briefly back to FIGS. 2 and 3, which show in total the effects of the entire method of FIG. 5, as seen in FIGS. 2 and 3, each "row" (range rate bin) of FIG. 2 is shifted (or adjusted) by a different amount to achieve proper registration in FIG. 3). Processing then returns to block 580/585 of FIG. 5.

Referring again to FIG. 5, after applying phase shifts/phase modulation for range registration, the output of block 585 has dimensions of fast frequency and range rate (relative to motion compensation value). In block 590, a range inverse Fourier transform is performed on only the range dimension, where the outputs are in a form of range (relative to motion compensation value) and rage rate (relative to motion compensation value). Effectively—this is a range Doppler map. Thus, in block 590, an image is formed (a range-Doppler map) wherein targets should show up in the image at correct positions in range.

Figure 22:
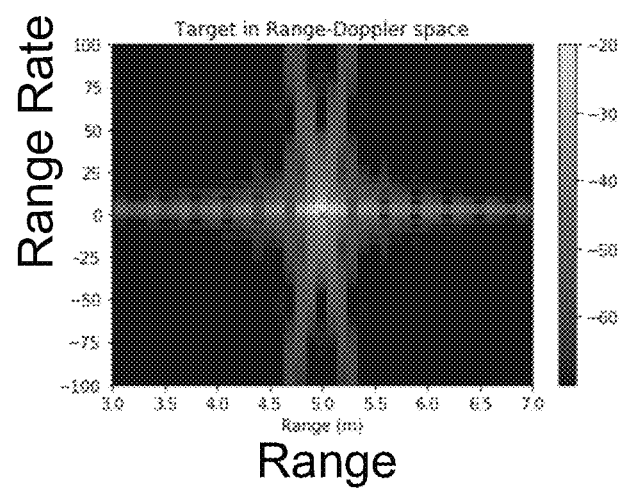
FIG. 22 is an exemplary graph showing an output of the method of FIG. 5, in accordance with one embodiment.

FIG. 22 is an exemplary graph 2270 showing an output of the method of FIG. 5, at block 590, in accordance with one embodiment. As the output graph shows, it is a range Doppler map showing a target properly located in range-Doppler space. In this particular example embodiment, the value of $\dot{r}_{rel}$ is zero, so range adjustment is not needed. However, reference can again be made to FIGS. 1-3, which illustrate the range adjustment of block 585, in accordance with another exemplary embodiment. Recall that FIG. 3 provided a range-Doppler map 300 of an exemplary ballistic missile scenario with keystone processing as provided herein (e.g., as provided in at least FIG. 2) and the range-Doppler map 300 of FIG. 3, can be contrasted with the range-Doppler map 300 of FIG. 2, which shows results of conventional keystone processing and inaccurate target locations, in contrast with to the more accurate keystone processing as provided herein.

Figure 23:
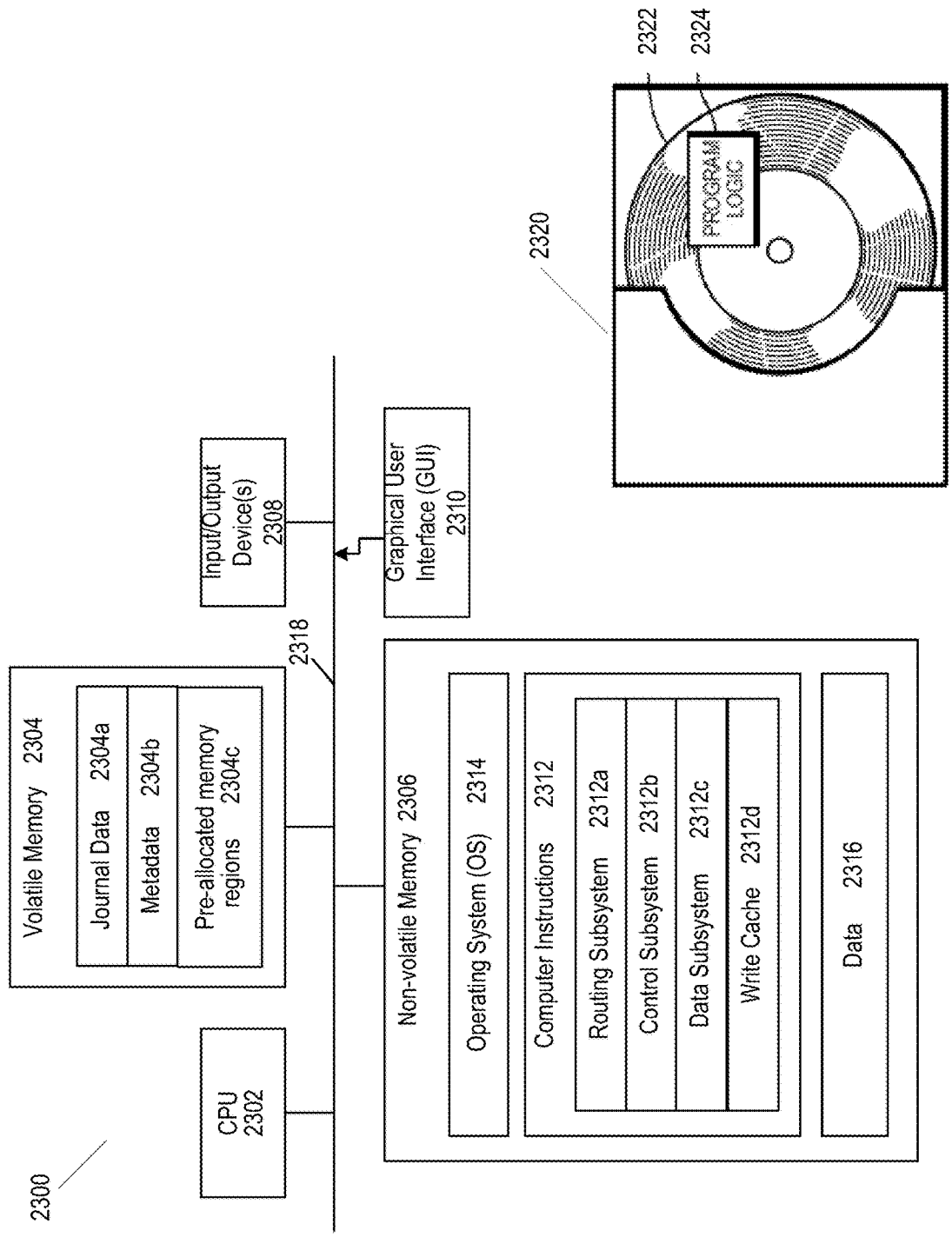
FIG. 23 is a block diagram of an exemplary computer system usable with at least some of the systems and apparatuses of FIGS. 1-22, in accordance with one embodiment.

FIG. 23 is a block diagram of an exemplary computer system usable with at least some of the systems and apparatuses of FIGS. 1-22, in accordance with one embodiment. The computer system 2300 of FIG. 23 is usable, in some embodiments, as the processor 426 of FIG. 4. Reference is made briefly to FIG. 23, which shows a block diagram of a computer system 2300 usable with at least some embodiments. The computer system 50 also can be used to implement all or part of any of the methods, equations, and/or calculations described herein.

As shown in FIG. 23, computer 2300 may include processor/CPU 2302, volatile memory 2304 (e.g., RAM), non-volatile memory 2306 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 2310 (e.g., a touchscreen, a display, and so forth) and input and/or output (I/O) device 2308 (e.g., a mouse, a keyboard, etc.). Non-volatile memory 2304 stores, e.g., journal data 2304a, metadata 2304b, and pre-allocated memory regions 2304c. The non-volatile memory, 2306 can include, in some embodiments, an operating system 2314, and computer instructions 2312, and data 2316. In certain embodiments, the computer instructions 2312 are configured to provide several subsystems, including a routing subsystem 2312A, a control subsystem 2312b, a data subsystem 2312c, and a write cache 2312d. In certain embodiments, the computer instructions 2312 are executed by the processor/CPU 2302 out of volatile memory 2304 to implement and/or perform at least a portion of the systems and processes shown in FIGS. 1-23B. Program code also may be applied to data entered using an input device or GUI 2310 or received from I/O device 2308.

The systems, architectures, and processes of FIGS. 1-23 are not limited to use with the hardware and software described and illustrated herein and may find applicability in any computing or processing environment and with any type of machine or set of machines that may be capable of running a computer program and/or of implementing a radar system (including, in some embodiments, software defined radar). The processes described herein may be implemented in hardware, software, or a combination of the two. The logic for carrying out the methods discussed herein may be embodied as part of the system described in FIG. 23. The processes and systems described herein are not limited to the specific embodiments described, nor are they specifically limited to the specific processing order shown. Rather, any of the blocks of the processes may be re-ordered, combined, or removed, performed in parallel or in serial, as necessary, to achieve the results set forth herein.

Processor 2302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital, or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid-state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 23, the machine becomes an apparatus for practicing one or more of the described embodiments. When implemented on one or more general-purpose processors, the program code combines with such a processor to provide a unique apparatus that operates analogously to specific logic circuits. As such a general-purpose digital machine can be transformed into a special purpose digital machine. FIG. 23 shows Program Logic 2324 embodied on a computer-readable medium 2320 as shown, and wherein the Logic is encoded in computer-executable code configured for carrying out the reservation service process of this invention and thereby forming a Computer Program Product 2322. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiments, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a", "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

Throughout the present disclosure, absent a clear indication to the contrary from the context, it should be understood individual elements as described may be singular or plural in number. For example, the terms "circuit" and "circuitry" may include either a single component or a plurality of components, which are either active and/or passive and are connected or otherwise coupled together to provide the described function. Additionally, the term "signal" may refer to one or more currents, one or more voltages, and/or or a data signal. Within the drawings, like or related elements have like or related alpha, numeric or alphanumeric designators (e.g., a component labeled as "204" in FIG. 2 may be similar to a component labeled "404" in FIG. 4, etc.). Further, while the disclosed embodiments have been discussed in the context of implementations using discrete components, including some components that include one or more integrated circuit chips), the functions of any component or circuit may alternatively be implemented using one or more appropriately programmed processors, depending upon the signal frequencies or data rates to be processed and/or the functions being accomplished.

Similarly, in addition, in the Figures of this application, in some instances, a plurality of system elements may be shown as illustrative of a particular system element, and a single system element or may be shown as illustrative of a plurality of particular system elements. It should be understood that showing a plurality of a particular element is not intended to imply that a system or method implemented in accordance with the invention must comprise more than one of that element, nor is it intended by illustrating a single element that the invention is limited to embodiments having only a single one of that respective elements. In addition, the total number of elements shown for a particular system element is not intended to be limiting; those skilled in the art can recognize that the number of a particular system element can, in some instances, be selected to accommodate the particular user needs.

In describing and illustrating the embodiments herein, in the text and in the figures, specific terminology (e.g., language, phrases, product brands names, etc.) may be used for the sake of clarity. These names are provided by way of example only and are not limiting. The embodiments described herein are not limited to the specific terminology so selected, and each specific term at least includes all grammatical, literal, scientific, technical, and functional equivalents, as well as anything else that operates in a similar manner to accomplish a similar purpose. Furthermore, in the illustrations, Figures, and text, specific names may be given to specific features, elements, circuits, modules, tables, software modules, systems, etc. Such terminology used herein, however, is for the purpose of description and not limitation.

Although the embodiments included herein have been described and pictured in an advantageous form with a certain degree of particularity, it is understood that the present disclosure has been made only by way of example, and that numerous changes in the details of construction and combination and arrangement of parts may be made without departing from the spirit and scope of the described embodiments. Having described and illustrated at least some the principles of the technology with reference to specific implementations, it will be recognized that the technology and embodiments described herein can be implemented in many other, different, forms, and in many different environments. The technology and embodiments disclosed herein can be used in combination with other technologies. In addition, all publications and references cited herein are expressly incorporated herein by reference in their entirety. Individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the following claims.

What is claimed is:

1. A system, comprising:
   a memory storing instructions for processing radar data contained within a plurality of radar returns received at a radar receiver, the plurality of radar returns associated with a scene being illuminated by a plurality of pulses transmitted by a radar transmitter; and
   a processor in operable communication with the memory, the processor configured to execute instructions stored on the memory to process the radar data, the processor executing the instructions to implement:
   a receive processing window formation subsystem that is configured to:
   receive the plurality of radar returns from the scene;
   form, for each radar return in the plurality of radar returns, a respective receive processing window containing the radar return as an unbroken radar return; and
   generate, for each respective unbroken radar return, a two-dimensional (2-D) array of data associated with the respective unbroken radar return, wherein one dimension of the 2-D array comprises overlapped receive range data;
   a matched filter subsystem in operable communication with the receive processing window formation subsystem and configured to create a motion model for a reference point target disposed at a predetermined location within the scene, based on an output of the receive processing window formation subsystem and on a set of motion compensation parameters for range and range rate, wherein the matched filter subsystem is configured to compensate for at least some effects of fast time Doppler on the reference point target, and wherein the matched filter subsystem is configured to output a two dimensional (2-D) array of information associated with the scene, the 2-D array comprising a first dimension comprising fast time frequency information and a second dimension comprising slow time information;
   a keystone interpolation subsystem configured to receive the 2-D array of information associated with the scene, from the matched filter subsystem, wherein the slow time information in the 2-D array of information is associated with a first scale, and wherein the keystone interpolation subsystem is configured to rescale the slow time information to a predetermined second scale, to produce a keystone interpolation subsystem output, comprising a keystone-interpolated 2-D output array of information associated with the scene, the information associated with the scene comprising a first-dimension of fast frequency and a second dimension of slow time;
   a phase modulation subsystem configured to receive the keystone interpolation subsystem output and to apply phase shifts to the keystone-interpolated 2-D output array of information associated with the scene, to shift each range rate bin in a range-Doppler map associated with the keystone-interpolated 2-D output array, in range, to ensure proper registration; and
   an image forming subsystem configured to generate, based on receiving a phase modulation output array, a range-Doppler map output of the scene having a predetermined range rate extent.

2. The system of claim 1, wherein the processor is further configured to provide a range compression inverse Fourier transform subsystem that is configured to perform an inverse Fourier transform on the output of the matched filter subsystem to produce a range compression inverse Fourier transform subsystem output comprising a set of range-compressed motion-compensated pulse data that is operably communicated to the keystone interpolation subsystem.

3. The system of claim 2, wherein the processor is further configured to implement a range window subsystem that is configured to perform a range windowing process on the range compression inverse Fourier transform subsystem output to minimize a rate of data into the keystone interpolation subsystem, wherein the range window subsystem is configured to:
  analyze the set of range-compressed motion-compensated pulse data of the range compression inverse Fourier transform subsystem output to determine a first subset of the range-compressed motion-compensated pulse data that is not in a range of interest, based on an overlapping arrangement of receive data into the receive processing window;
  define a second subset of the range-compressed motion-compensated pulse data comprising samples in a range of interest; and
  provide only the second subset of the range-compressed motion-compensated pulse data to the keystone interpolation subsystem.

4. The system of claim 1, wherein the plurality of radar returns comprises a one-dimensional data record and wherein the receive processing window formation subsystem is configured to:
  define an expanded processing window having a size greater than a sum of a pulse repetition interval (PRI) and a pulsewidth associated with the plurality of radar returns from at least a first scatterer in the scene; and
  slide the expanded processing window along the one-dimensional data record, one pulse at a time, wherein for each pulse, the data contained within the expanded processing window are copied into a two-dimensional array (2-D) whose dimensions are range sample number and pulse number, so that contents of the window are copied into a corresponding pulse of the 2-D array so that each pulse contains a respective unbroken return from a respective target in the scene.

5. The system of claim 1, wherein the matched filter subsystem is configured to operate on fast frequency data received as an output of a first range Fourier transform subsystem and wherein the first range Fourier transform subsystem is configured to perform a Fourier transform on the overlapped receive range data in an output of the receive processing window formation subsystem, before the output of the receive processing window formation subsystem is provided to the matched filter subsystem.

6. The system of claim 1, wherein the matched filter subsystem is configured to:
  define a set of matched filter parameters based on a linear model of target range, a linear frequency modulation (LFM) waveform, and on the set of motion compensation parameters; and
  apply a matched filter, based on the set of matched filter parameters, to a fast-time Fourier transform of the output of the receive processing window formation subsystem.

7. The system of claim 1, wherein the keystone interpolation subsystem is configured to a apply a low-pass finite impulse response (FIR) filter to rescale the slow time information to the predetermined second scale, wherein a passband of the FIR filter is configured to correspond to a desired range rate extent in the range-Doppler map output.

8. The system of claim 7, wherein the phase modulation subsystem is configured to:
  perform a range rate inverse Fourier transform on the keystone-interpolated 2-D output array, to convert the keystone-interpolated 2-D output array to a 2-D phase modulation input array, the 2-D phase modulation input array comprising information associated with the scene, comprising a first dimension of fast frequency and a second dimension of range rate relative to the set of motion compensation parameters;
  determine a phase modulation for each range rate bin of a range-Doppler map for a target located within the scene, to ensure proper registration;
  apply the phase modulations to the 2-D phase modulation input array; and
  generate a phase modulation output array comprising the phase-modulated 2-D phase modulation input array.

9. The system of claim 1, wherein the radar receiver and radar transmitter are part of at least one of a bistatic and a multistatic radar system.

10. The system of claim 1, wherein the predetermined location corresponds to a location that is at an approximate center of the scene.

11. The system of claim 1, wherein the plurality of radar returns corresponds to radar returns from a train of transmitted pulses from the radar transmitter and wherein each respective receive processing window that is formed is associated with a respective one of the pulses in the train of transmitted pulses.

12. A method, comprising:
  receiving a plurality of radar returns associated with a scene being illuminated by a plurality of pulses;
  forming, for each radar return in the plurality of radar returns, a respective receive processing window containing the radar return as an unbroken radar return;
  generating, for each respective unbroken radar return, a two-dimensional (2-D) array of data associated with the respective unbroken radar return, wherein one dimension of the 2-D array comprises overlapped receive range data;
  providing a matched filter configured to:
    create a motion model for a reference point target disposed at a predetermined location within the scene based on the 2-D array of data and on a set of motion compensation parameters for range and range rate;
    compensate for at least some effects of fast time Doppler on the reference point target; and
    output a two dimensional (2-D) array of information associated with the scene, the 2-D array comprising a first dimension comprising fast time frequency information and a second dimension comprising slow time information;
  performing a keystone interpolation on the 2-D array of information associated with the scene, the keystone interpolation comprising:
    associating the slow time information in the 2-D array with a first scale; and
    rescaling the slow time information to a predetermined second scale, to produce a keystone-interpolated 2-D output array of information associated with the scene, the information associated with the scene comprising a first-dimension of fast frequency and a second dimension of slow time;
  applying phase modulations to the keystone-interpolated 2-D output array of information associated with the scene, to shift each range rate bin in a range-Doppler map associated with the keystone-interpolated 2-D output array, in range, to ensure proper registration; and generating, based on receiving a phase modulation output array, a range-Doppler map output of the scene having a predetermined range rate extent.

13. The method of claim 12, further comprising:
performing an inverse Fourier transform on the 2-D array of information associated with the scene, before performing keystone interpolation, wherein the inverse Fourier transform produces a set of range-compressed motion-compensated pulse data.

14. The method of claim 13, further comprising:
performing a range windowing process on the set of range-compressed motion-compensated pulse data before performing keystone interpolation, the range windowing process comprising:
 analyzing the range-compressed motion-compensated pulse data to determine a first subset of the range-compressed motion-compensated pulse data that is not in a range of interest, based on an overlapping arrangement of receive data into the receive processing window;
 defining a second subset of the range-compressed motion-compensated pulse data comprising samples in a range of interest; and
 providing only the second subset of the range-compressed motion-compensated pulse data as an input to performing a keystone interpolation on the 2-D array of information associated with the scene;
wherein the range windowing process is configured to minimize a rate of data into the performing of the keystone interpolation.

15. The method of claim 12, wherein the plurality of radar returns comprises a one-dimensional data record and further comprising:
defining an expanded processing window having a size greater than a sum of a pulse repetition interval (PRI) and a pulsewidth associated with the plurality of radar returns from at least a first scatterer in the scene; and
sliding the expanded processing window along the one-dimensional data record, one pulse at a time, wherein for each pulse, the data contained within the expanded processing window are copied into a two-dimensional array (2-D) whose dimensions are range sample number and pulse number, so that contents of the window are copied into a corresponding pulse of the 2-D array so that each pulse contains a respective unbroken return from a respective target in the scene.

16. The method of claim 12, further comprising:
defining a set of matched filter parameters based on a linear model of target range, a linear frequency modulation (LFM) waveform, and on the set of motion compensation parameters; and
applying a matched filter, based on the set of matched filter parameters, to a fast-time Fourier transform of an output of the receive processing window.

17. The method of claim 12 wherein the keystone interpolation further comprises applying a low-pass finite impulse response (FIR) filter to rescale the slow time information to the predetermined second scale, wherein a passband of the FIR filter is configured to correspond to a desired range rate extent in the range-Doppler map output.

18. The method of claim 17, further comprising:
performing a range rate inverse Fourier transform on the keystone-interpolated 2-D output array, to convert the keystone-interpolated 2-D output array to a 2-D phase modulation input array, the 2-D phase modulation input array comprising information associated with the scene, comprising a first dimension of fast frequency and a second dimension of range rate relative to the set of motion compensation parameters;
determining a phase modulation for each rate bin of a range-Doppler map for a target located within the scene, to ensure proper registration;
applying the phase modulations to the 2-D phase modulation input array; and
generating a phase modulation output array comprising the phase shifted 2-D phase modulation input array.

19. A circuit, comprising:
a receive processing window formation subsystem configured to receive a plurality of radar returns from a scene, the plurality of radar returns associated with a scene being illuminated by a plurality of pulses transmitted by a radar transmitter, to form, for each radar return in the plurality of radar returns, a respective receive processing window containing the radar return as an unbroken radar return, and to generate, for each respective unbroken radar return, a two-dimensional (2-D) array of data associated with the respective unbroken radar return, wherein one dimension of the 2-D array comprises overlapped receive range data;
a matched filter subsystem in operable communication with the receive processing window formation subsystem and configured to create a motion model for a reference point target disposed at a predetermined location within the scene based on an output of the receive processing window formation subsystem and on a set of motion compensation parameters for range and range rate, wherein the matched filter subsystem is configured to compensate for at least some effects of fast time Doppler on the reference point target, and wherein the matched filter subsystem is configured to output a two dimensional (2-D) array of information associated with the scene, the 2-D array of information comprising a first dimension comprising fast time frequency information and a second dimension comprising slow time information;
a keystone interpolation subsystem configured to receive the 2-D array of information associated with the scene, from the matched filter subsystem, wherein the slow time information in the 2-D array of information is associated with a first scale, and wherein the keystone interpolation subsystem is configured to rescale the slow time information to a predetermined second scale, to produce a keystone interpolation subsystem output, comprising a keystone-interpolated 2-D output array of information associated with the scene, the information associated with the scene comprising a first-dimension of fast frequency and a second dimension of slow time;
a phase modulation subsystem configured to receive the keystone interpolation subsystem output and to apply phase modulations to the keystone-interpolated 2-D output array of information associated with the scene, to shift each range rate bin in a range-Doppler map associated with the keystone-interpolated 2-D output array, in range, to ensure proper registration; and
an image forming subsystem configured to generate, based on receiving a phase modulation output array, a range-Doppler map output of the scene having a predetermined range rate extent.

20. The radar processing circuit of claim 19 wherein the plurality of radar returns comprises a one-dimensional data record and wherein the receive processing window formation subsystem is configured to:

define an expanded processing window having a size greater than a sum of a pulse repetition interval (PRI) and a pulsewidth associated with the plurality of radar returns from at least a first scatterer in the scene; and slide the expanded processing window along the one-dimensional data record, one pulse at a time, wherein for each pulse, the data contained within the expanded processing window are copied into a two-dimensional array (2-D) whose dimensions are range sample number and pulse number, so that contents of the window are copied into a corresponding pulse of the 2-D array so that each pulse contains a respective unbroken return from a respective target in the scene.

* * * * *